(12) United States Patent
Kim et al.

(10) Patent No.: US 8,554,897 B2
(45) Date of Patent: Oct. 8, 2013

(54) DATA SHARING BETWEEN SMART DEVICES

(75) Inventors: Kyungjin Kim, Seoul (KR); Kiwon Lee, Gyeonggi-Do (KR); Sungil Cho, Seoul (KR); Jiyoung Hong, Seoul (KR); Sungeun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 224 days.

(21) Appl. No.: 13/061,408

(22) PCT Filed: Jan. 24, 2011

(86) PCT No.: PCT/KR2011/000484
§ 371 (c)(1),
(2), (4) Date: Feb. 28, 2011

(87) PCT Pub. No.: WO2012/102416
PCT Pub. Date: Aug. 2, 2012

(65) Prior Publication Data
US 2012/0191832 A1      Jul. 26, 2012

(51) Int. Cl.
*G06F 15/173* (2006.01)
(52) U.S. Cl.
USPC ............................. 709/223; 715/761; 715/863
(58) Field of Classification Search
USPC .......................................................... 709/205
See application file for complete search history.

(56) References Cited

U.S. PATENT DOCUMENTS

| | | | |
|---|---|---|---|
| 7,188,181 B1 | 3/2007 | Squier et al. | |
| 7,620,667 B2 | 11/2009 | Rollin et al. | |
| 7,751,347 B2 | 7/2010 | Giroti | |
| 7,844,297 B2 | 11/2010 | Hawkins | |
| 8,112,490 B2 * | 2/2012 | Upton et al. | 709/208 |
| 2004/0044723 A1 * | 3/2004 | Bell et al. | 709/203 |
| 2008/0281919 A1 * | 11/2008 | Shamp et al. | 709/205 |
| 2008/0305813 A1 * | 12/2008 | Rao | 455/466 |
| 2009/0265163 A1 * | 10/2009 | Li et al. | 704/10 |
| 2011/0083111 A1 * | 4/2011 | Forutanpour et al. | 715/863 |
| 2011/0142016 A1 * | 6/2011 | Chatterjee | 370/338 |

* cited by examiner

Primary Examiner — Dustin Nguyen
(74) Attorney, Agent, or Firm — Birch, Stewart, Kolasch & Birch, LLP

(57) ABSTRACT

Data sharing between networked smart devices is disclosed. One embodiment of the present disclosure pertains to a method for data sharing with one or more associated smart devices via a network. The method comprises displaying, on a display unit of the smart device, an image for each one of the associated smart devices within coverage of the network and an image of shared data. The method also comprises effecting a change in a first image for a first smart device of the associated smart devices when the first smart device is targeted as a target device for the data sharing. The method further comprises communicating the shared data with the first smart device via the network when, on the display unit, the image of the shared data is moved to or from a domain of the first image of the first smart device.

20 Claims, 23 Drawing Sheets

FIG. 2
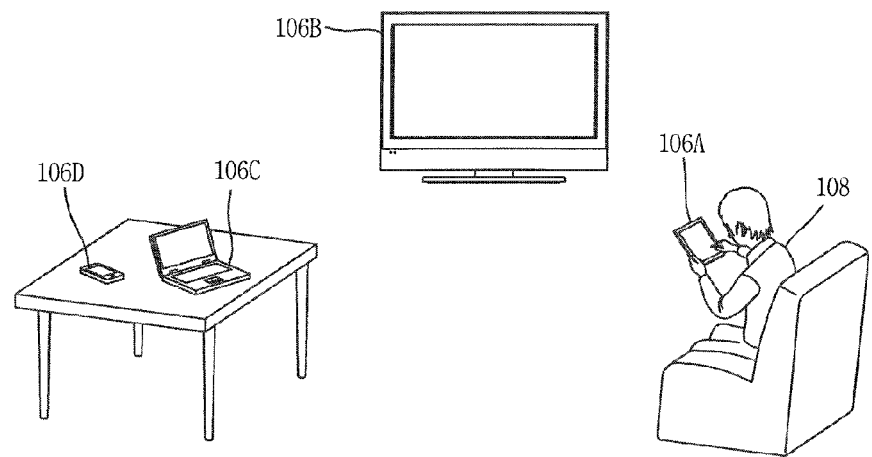
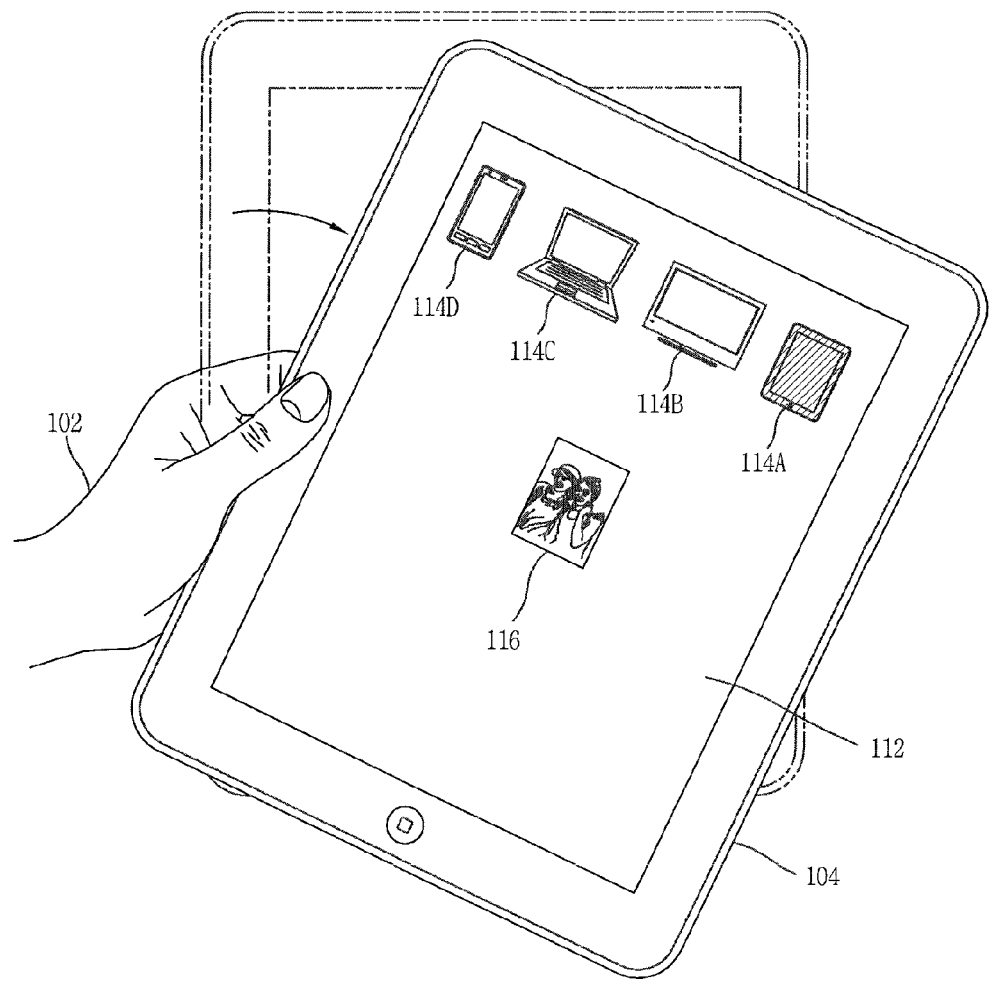

FIG. 13
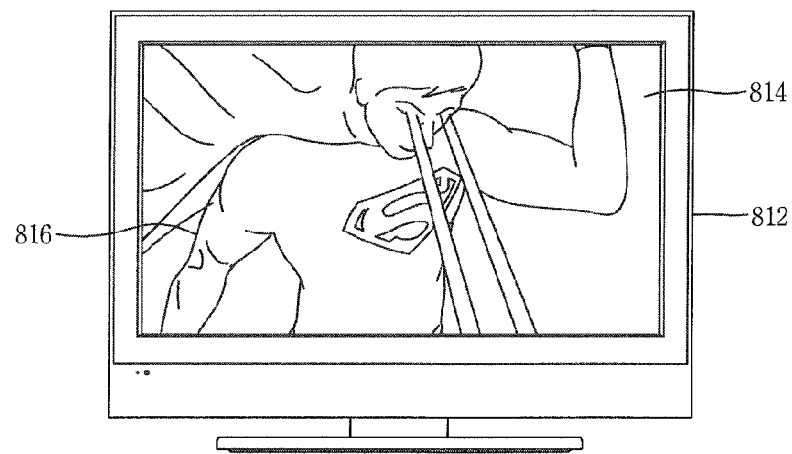
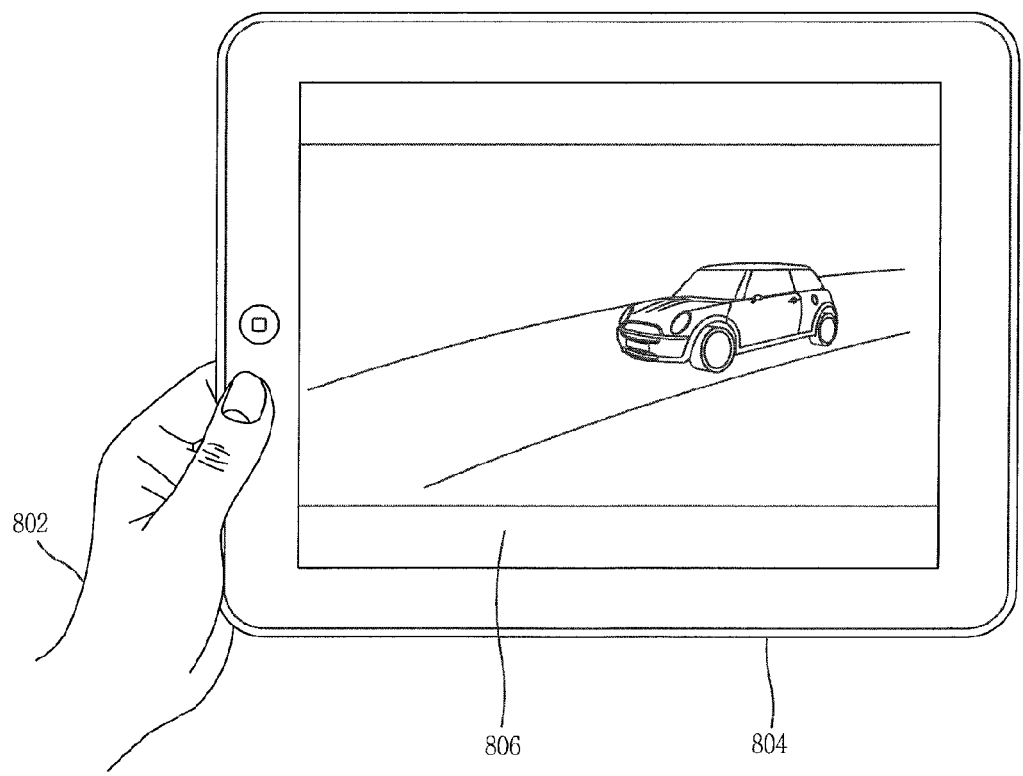

FIG. 16
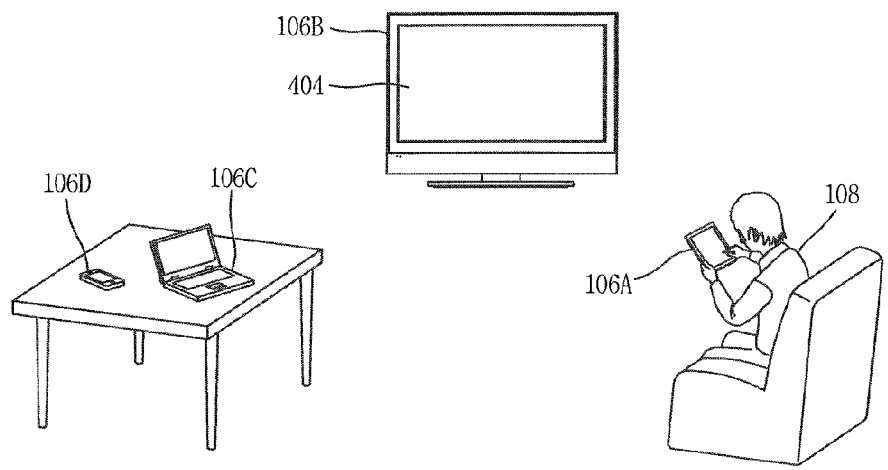
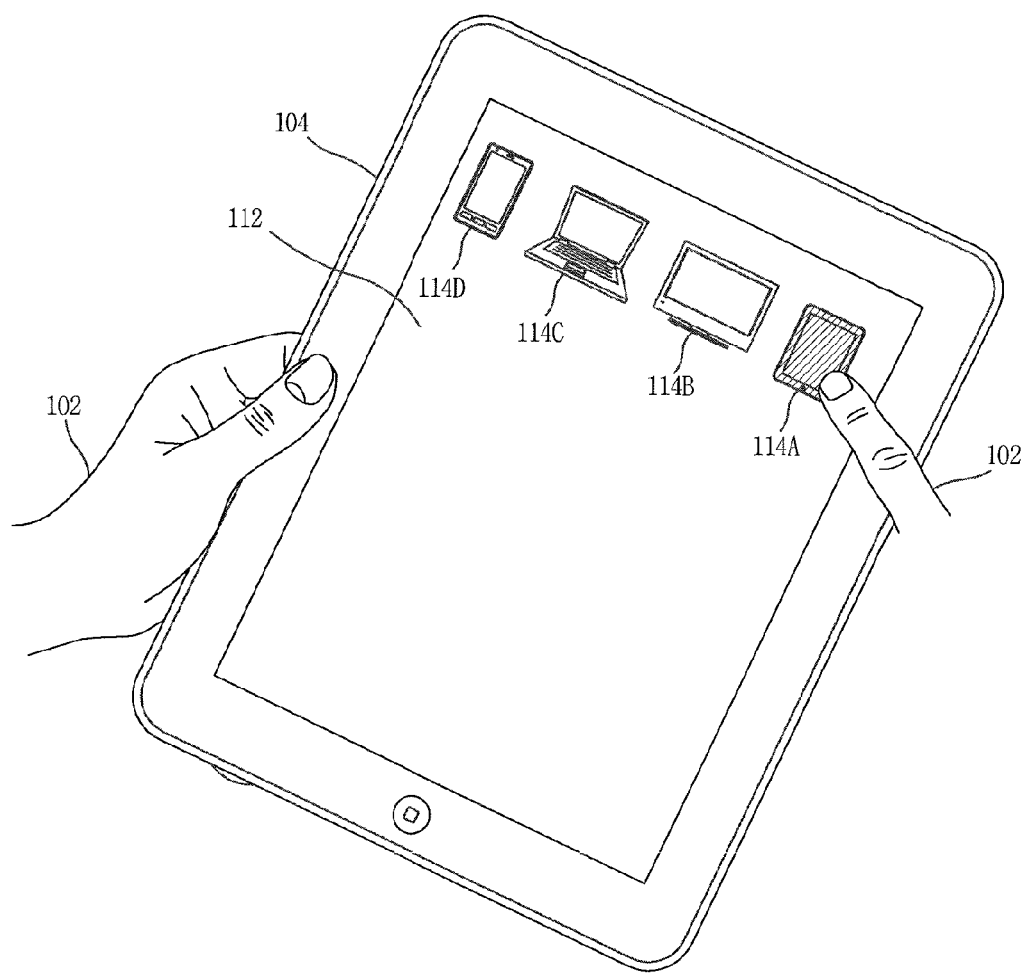

FIG. 17
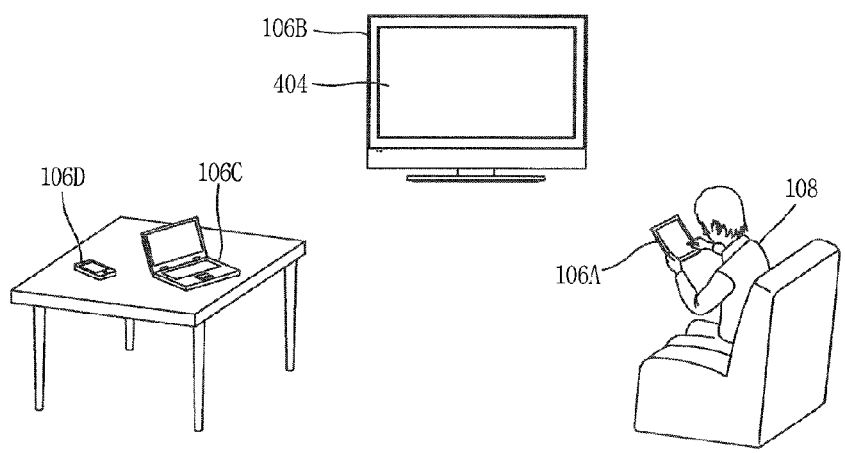
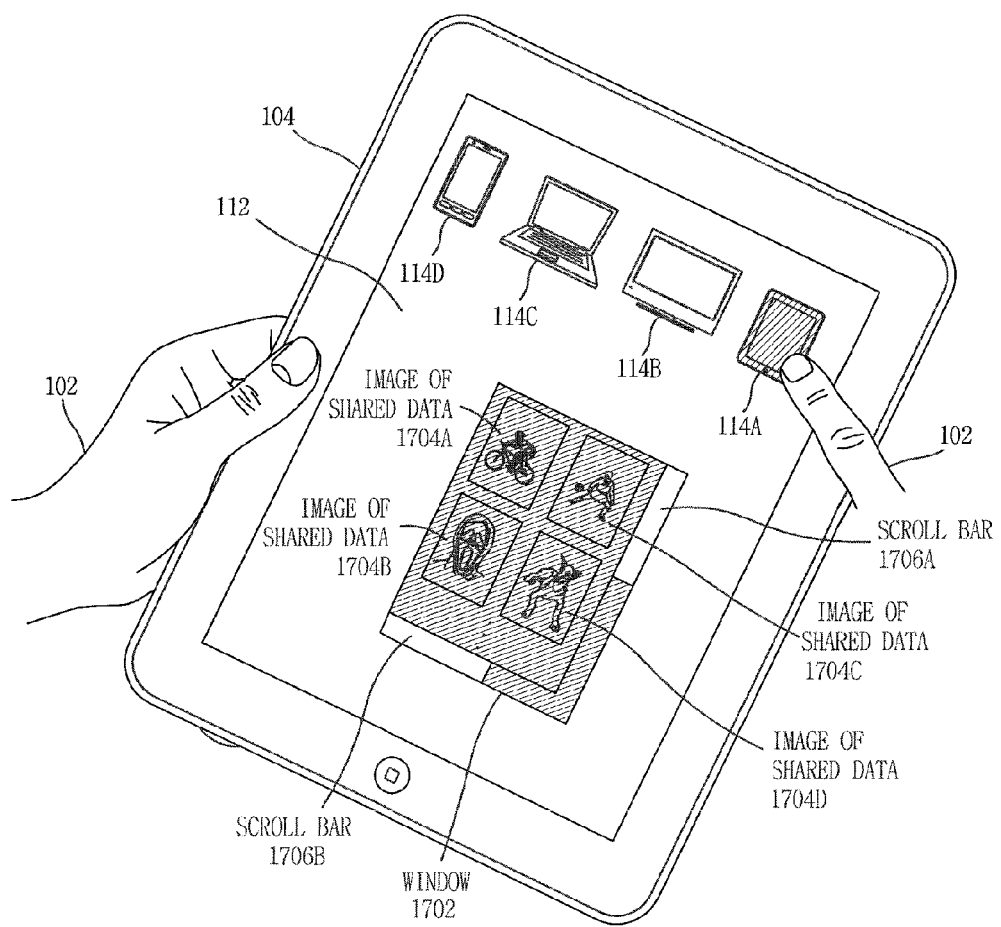

DATA SHARING BETWEEN SMART DEVICES

FIELD OF TECHNOLOGY

Embodiments of the present disclosure relate to the field of electronics. More particularly, embodiments of the present disclosure relate to data sharing between smart devices in a network.

BACKGROUND

Smart devices are devices that are digital, active, and computer networked. The smart devices are also user configurable and can operate to some extent autonomously. Some of the examples of the smart devices may include a personal computer (PC), a tablet PC, a smart TV, a mobile phone, a laptop computer, etc. Recently, there are ongoing efforts to find more effective ways to share data (e.g., audio data, video data, etc.) among the smart devices connected through the network.

SUMMARY

One embodiment of the present disclosure pertains to a smart device for data sharing with one or more associated smart devices connected via a network, where the smart device comprises a transceiver, a display unit, a memory, and a processor coupled to the transceiver, the display unit, and the memory. The processor is configured to generate, to display on the display unit, an image for each one of the associated smart devices within coverage of the network and an image of shared data. The processor is also configured to effect a change in a first image for a first smart device of the associated smart devices when the first smart device is targeted as a target device for the data sharing, and communicate the shared data with the first smart device via the network when, on the display unit, the image of the shared data is moved to or from a domain of the first image of the first smart device.

BRIEF DESCRIPTION OF THE DRAWINGS

Example embodiments are illustrated by way of example and not limitation in the figures of the accompanying drawings, in which like references indicate similar elements and in which:

FIG. 2 illustrates an exemplary view of the smart device in FIG. 1 selecting a first smart device as a target device, according to one embodiment of the present disclosure.

FIGS. 8-13 illustrate an exemplary view of the smart device in FIG. 1 interacting with a target device for sharing moving image data, according to one embodiment of the present disclosure.

FIGS. 16-18 illustrate an exemplary process of the smart device in FIG. 1 for accessing data in a target device, according to one embodiment of the present disclosure.

Figure 1:
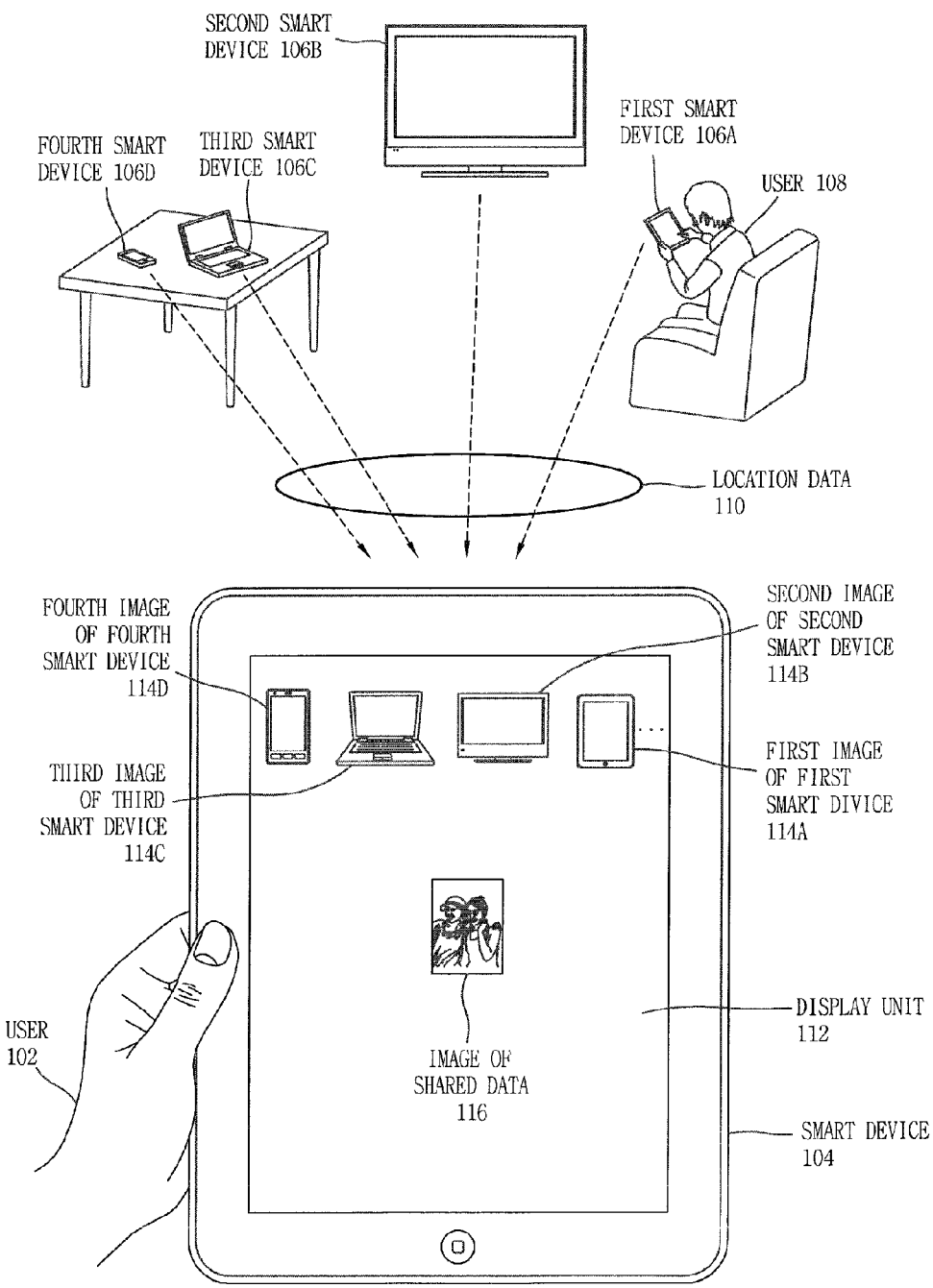
FIG. 1 illustrates an exemplary network view of a smart device interacting with associated smart devices via a network, according to one embodiment of the present disclosure.

Other features of the present embodiments will be apparent from the accompanying drawings and from the detailed description that follows.

DETAILED DESCRIPTION

A smart device and method thereof that seamlessly share data with associated smart devices via a network are disclosed. According to embodiments of this disclosure, a number of smart devices may be connected through a network. A user of a smart device may want to share data with other available smart devices in a convenient and user friendly manner. In addition, it is often a concern to the user that the time taken to perform the data sharing is too long especially when the size of the data is rather large.

As a solution, the present disclosure provides a user interface, method, and device which provide an allure to the user that the data sharing is taking place faster than it actually is. In one embodiment, images of the associated smart devices within the coverage of the network and an image of shared data (or data to be transmitted) are displayed on the display unit of the smart device. Then, as the user directs the body of the smart device to one of the associated smart devices, the image of the targeted smart device changes its size or complexion (e.g., texture, color, etc.) to indicate that it is being targeted. As the user moves the image of shared data within the domain of the image of the targeted smart device displayed on the smart device, a transmitted image of the shared data (e.g., a thumbnail image) appears on the display unit of the targeted device.

Further, the transmission of the shared data is performed. In this embodiment, through forwarding the image of shared data (e.g., the thumbnail image of shared data) to the targeted device and displaying the transmitted image of shared data on the display unit of the targeted device, upon the initiation of the data transmission, the user operating the targeted smart device may be informed of the ongoing data sharing. Further, when the shared data is of large size (e.g., moving image data), the transmission of the thumbnail image at the initiation of the data transfer, while the shared data is being processed by a buffer of the targeted device, may provide an allure to the user of the targeted device that the data transfer or sharing is taking place much faster than it actually is.

In another embodiment, images of the associated smart devices within the coverage of the network and an image of the shared data are displayed on the display unit of the smart device. Then, as the user directs the body of the smart device to one of the associated smart devices, an image of the targeted smart device changes its size or complexion to indicate that it is being targeted. As the user accesses the image of the targeted smart device displayed on the smart device, a list of shared data (e.g., items of shared data) offered by the targeted smart device appears on the display unit of the smart device. The user may affirm an order of an item from the list of shared data by dragging the item to the domain of the smart device from the domain of the image of the targeted smart device on the display unit of the smart device. As a result, the transmission of the shared data from the targeted device to the smart device is performed.

As described above, the present disclosure provides a smart device and method thereof for data sharing. More particularly, the smart device according to the present disclosure provides a user-friendly user interface which makes it convenient for the user to select a target device for data sharing and perform the data sharing. Further, the smart device according to the present disclosure offers an allure to the user that the data transfer between the smart device and the targeted device is happening much faster than it actually is.

Reference will now be made in detail to the embodiments of the disclosure, examples of which are illustrated in the accompanying drawings. While the disclosure will be described in conjunction with the embodiments, it will be understood that they are not intended to limit the disclosure to these embodiments. On the contrary, the disclosure is intended to cover alternatives, modifications and equivalents, which may be included within the spirit and scope of the disclosure. Furthermore, in the detailed description, numerous specific details are set forth in order to provide a thorough understanding of the present disclosure. However, it will be obvious to one of ordinary skill in the art that the present disclosure may be practiced without these specific details. In other instances, well known methods, procedures, components, and circuits have not been described in detail as not to unnecessarily obscure aspects of the present disclosure.

FIG. 1 illustrates an exemplary network view of a smart device 104 (e.g., a tablet PC) interacting with associated smart devices via a network, according to one embodiment of the present disclosure. The smart device 104 and the associated smart devices may be owned by a single user (e.g., a user 102), or they may be owned by different users. In FIG. 1, the smart device 104 is connected with a first smart device 106A (e.g., a tablet PC operated by a user 108), a second smart device 106B (e.g., a smart TV), a third smart device 106C (e.g., a laptop), and a fourth smart device 106D (e.g., a smart phone) via a network. In one embodiment, the network may be any combination of a short range network, a local area network (LAN), a home area network, a campus network, a global area network, an enterprise private network, a virtual private network, an internetwork, an Internet, an intranet and extranet, an overlay network, etc.

As illustrated in FIG. 1, the smart device 104A is configured to display on a display unit 112, respective images of the associated smarts devices within coverage of the network and an image of shared data 116. In the exemplary view of FIG. 1, the display unit 112 displays a first image of first smart device 114A, a second image of second smart device 114B, a third image of third smart device 114C, and a fourth image of fourth smart device 114D in addition to the image of shared data 116. The first image of first smart device 114A, the second image of second smart device 114B, the third image of third smart device 114C, and the fourth image of fourth smart device 114D may be based on icons taking after the real images of the smart devices.

Alternatively, the first image of first smart device 114A, the second image of second smart device 114B, the third image of third smart device 114C, and the fourth image of fourth smart device 114D may be pictures of the real images of the smart devices. A transceiver of the smart device 104 may be configured to receive location data (e.g., GPS data) of the associated smart devices, where the location may be used to arrange the order of the images of associated smart devices 114A-D. That is, the images of associated smart devices 114A-D on the display unit 112 may be generated based on the location data which indicate that the first smart device (e.g., the tablet PC) is located to the rightmost direction, whereas the fourth image of fourth smart device 114D is located to the leftmost direction.

FIGS. 2-7 illustrate an exemplary view of the smart device 104 in FIG. 1 interacting with a target device for sharing shared data 302, according to one embodiment of the present disclosure. More particularly, FIG. 2 illustrates an exemplary view of the smart device 104 in FIG. 1 selecting the first smart device 106A as a target device, according to one embodiment of the present disclosure. In one embodiment, the first image of the first smart device 114A on the display unit 112 is changed when the first smart device 114A is targeted as a target device for data sharing. For example, the first smart device 106A is designated as the target device when a body of the smart device 104 is directed to the first smart device 106A as illustrated in FIG. 2.

In one example implementation, the smart device 104 is equipped with a sensor which is configured to sense the orientation of the smart device 104 being directed to the target device. The sensor may be a gyro sensor, an acceleration sensor, a geomagnetic sensor, or other type of sensor. Then, the target device is identified based on location data of the target device 106A and tilt data sensed by the gyro sensor when the first smart device is targeted as the target device. In one embodiment, when the first smart device 106A is selected as the target device, the size of the first image of first smart device 114A or the complexion of the first image of first smart device 114A is changed. For example, the size of the first image of first smart device 114A on the display unit 112 is increased to indicate the selection of the first smart device 106A as the target device. Alternatively, the first image of first smart device 114A is highlighted to indicate the selection.

Figure 3:
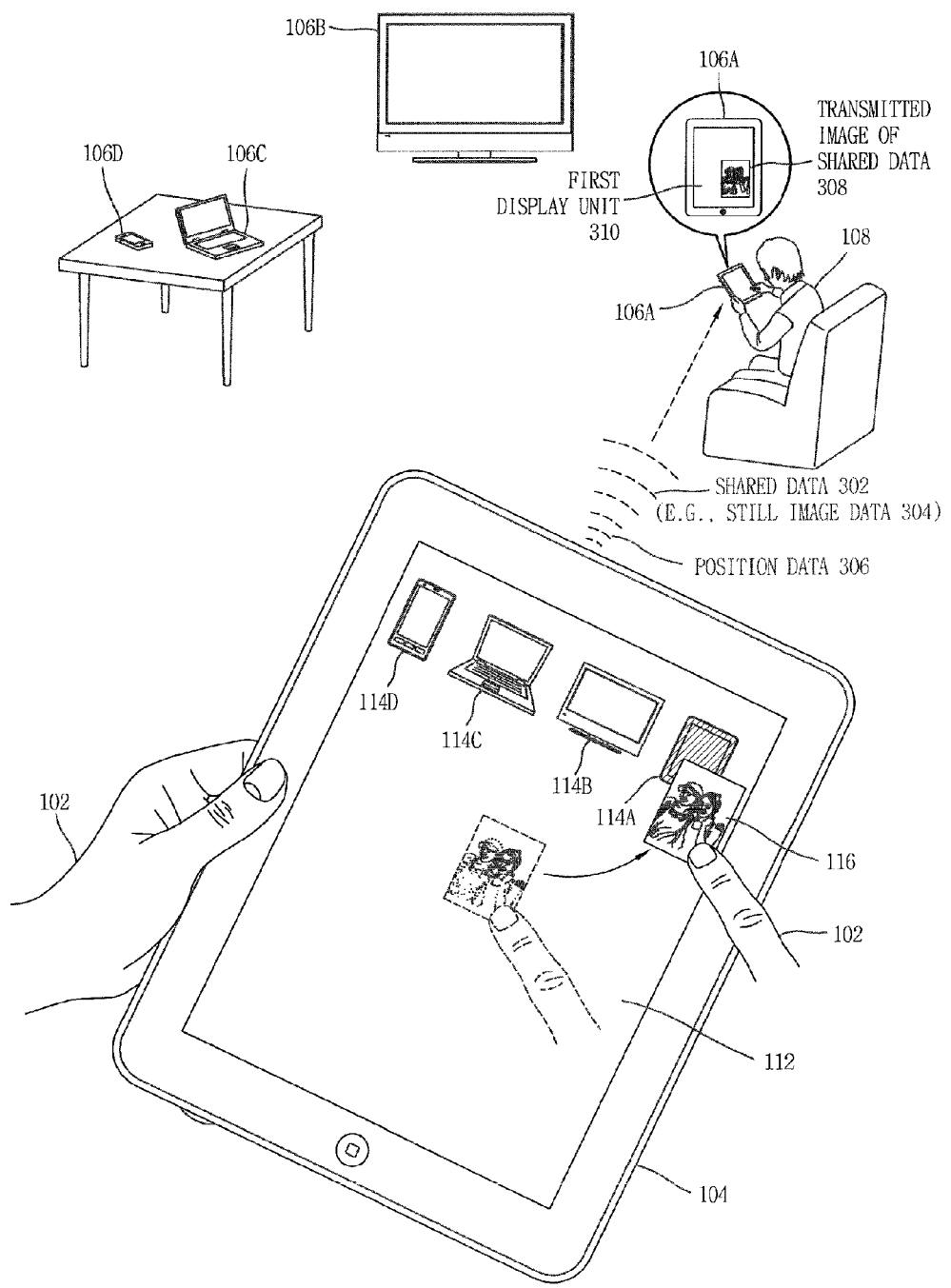
FIG. 3 illustrates an exemplary view of the smart device in FIG. 1 performing data sharing with the first smart device, according to one embodiment of the present disclosure.

FIG. 3 illustrates an exemplary view of the smart device in FIG. 1 performing data sharing with the first smart device 106A, according to one embodiment of the present disclosure. In FIG. 3, the smart device 104 transmits shared data 302 stored in a memory of the smart device 104 and represented by the image of shared data 116 via the network when, on the display unit 112, the image of shared data 116 is moved into the domain of the first image of first smart device 114A. In one embodiment, the shared data 302 comprises still image data 304.

In addition, the smart device 104 transmits meta-data of the shared data 302. In one example embodiment, the meta-data of the shared data 302 comprises position data 306 of the image of shared data 116 with respect to coordinates of the first image of first smart device 114A on the display unit 112. As illustrated in FIG. 3, as the image of shared data 116 moves onto the bottom left portion of the first image of first device 114A, a transmitted image of shared data 308 is displayed at the bottom left portion of a first display unit 310 on the first smart device 106A. That is, the position data 306 is processed by the first smart device 106A to display the transmitted image of shared data 308 on a designated area of the first display unit 310 of the first smart device 106A.

In one embodiment, the image of shared data 116 displayed on the display unit 112 of the smart device 104 is a thumbnail image of the shared data 302. Further, the thumbnail image of the shared data 302 may be transmitted to the first smart device 106A in addition to the shared data 302 and the position data 306. Since the size of the thumbnail image is small, the transmission of the thumbnail image of the shared data 302 may be completed prior to the transmission of the shared data 302. This may be especially true when the size of the shared data 302 is too large to delay its transmission. By quickly transmitting the thumbnail image of the shared data 302 as the transmission of the shared data 302 is in progress, the user 108 may be informed of the transmission of the shared data 302 in progress. In case the first smart device 106A is owned and operated by the user 102 of the smart device 104, the user 102 may be informed of the transmission of the shared data 302 in progress by identifying the thumbnail image of the shared data 302 (e.g., the transmitted image of shared data 308) appearing on the first display unit 310 of the first smart device 106A.

Figure 4:
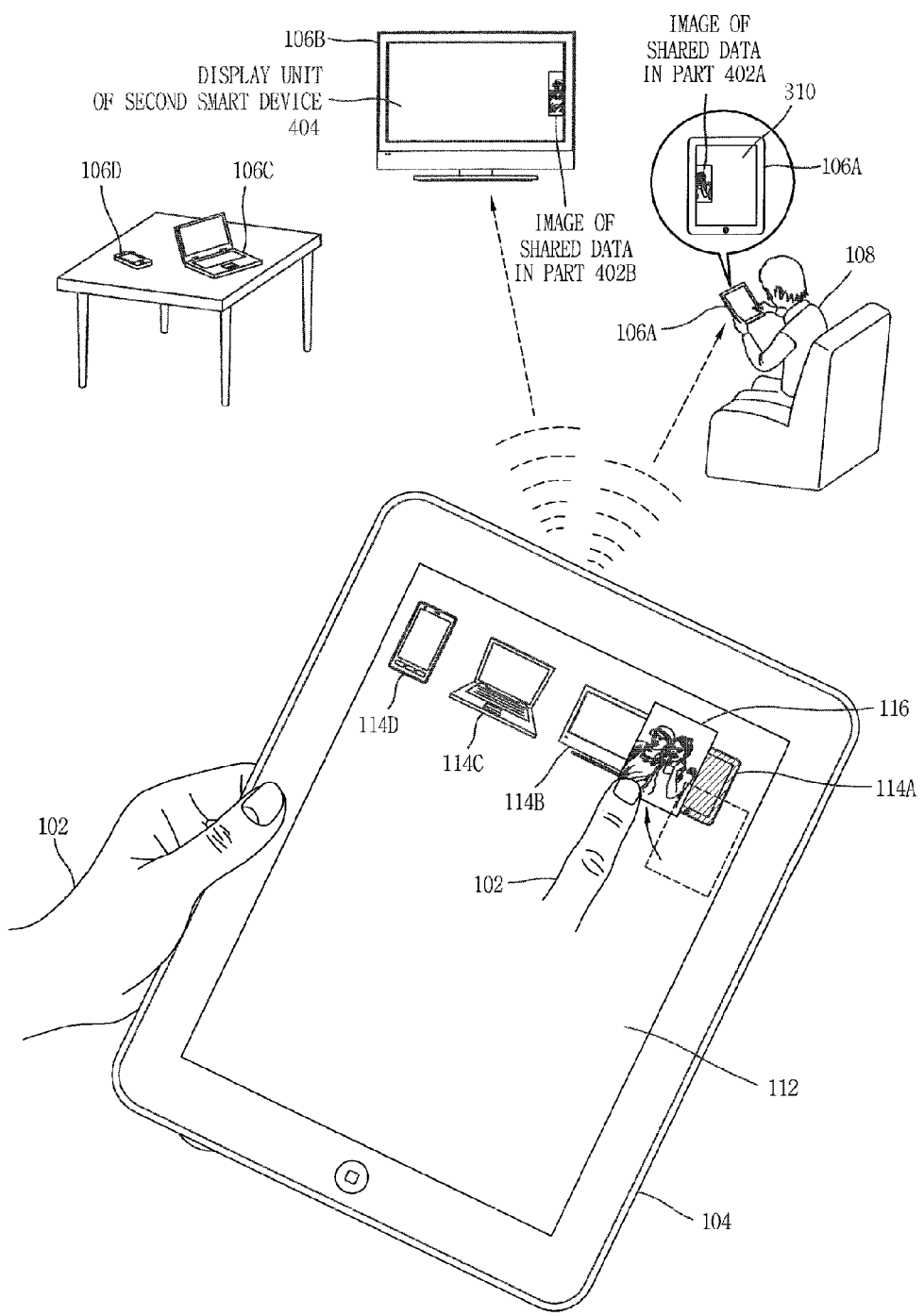
FIGS. 4-6 illustrate an exemplary view of the smart device in FIG. 1 cancelling data sharing with the first smart device and performing data sharing with a second smart device, according to one embodiment of the present disclosure.
Figure 5:
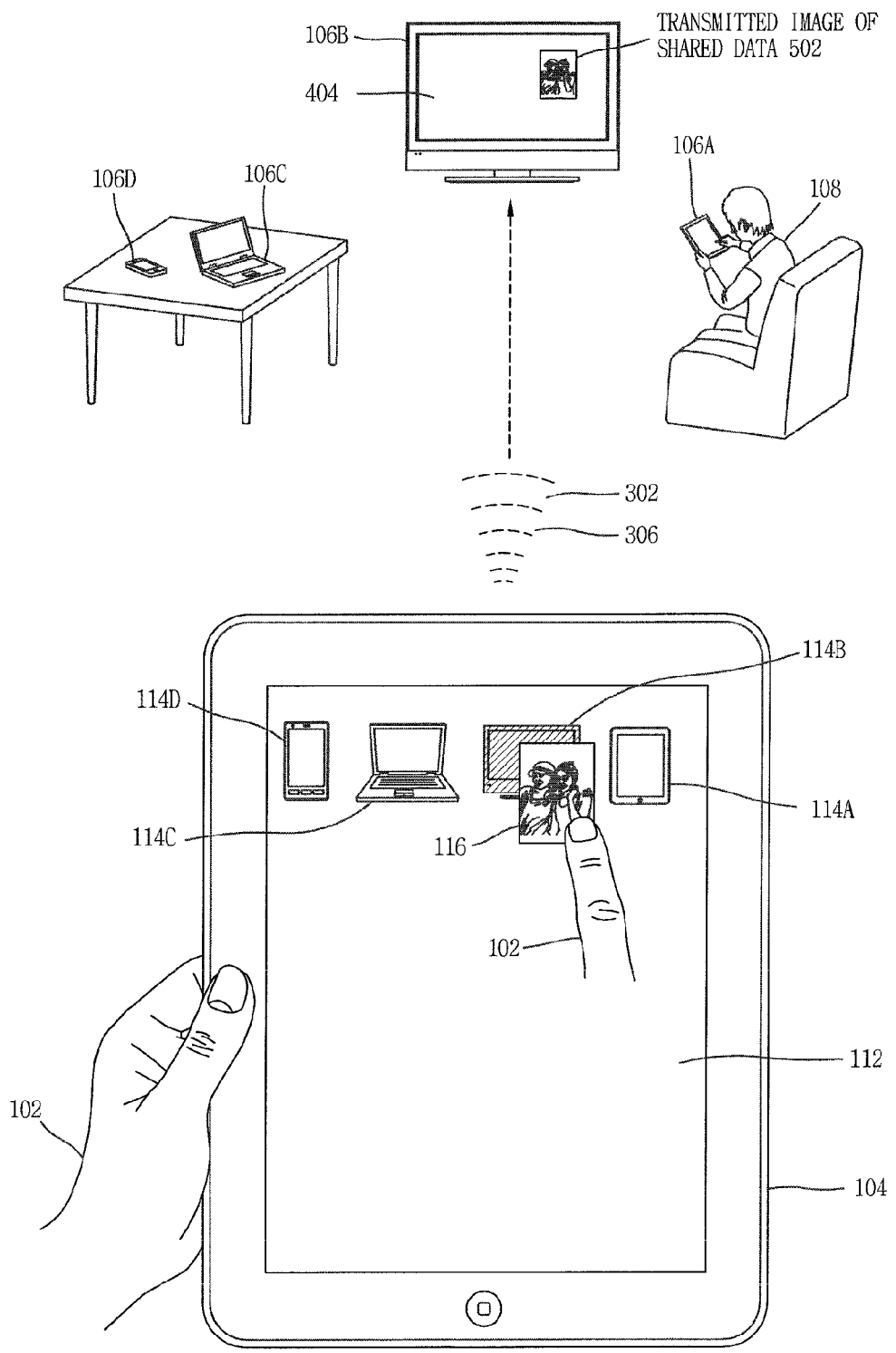
Figure 6:
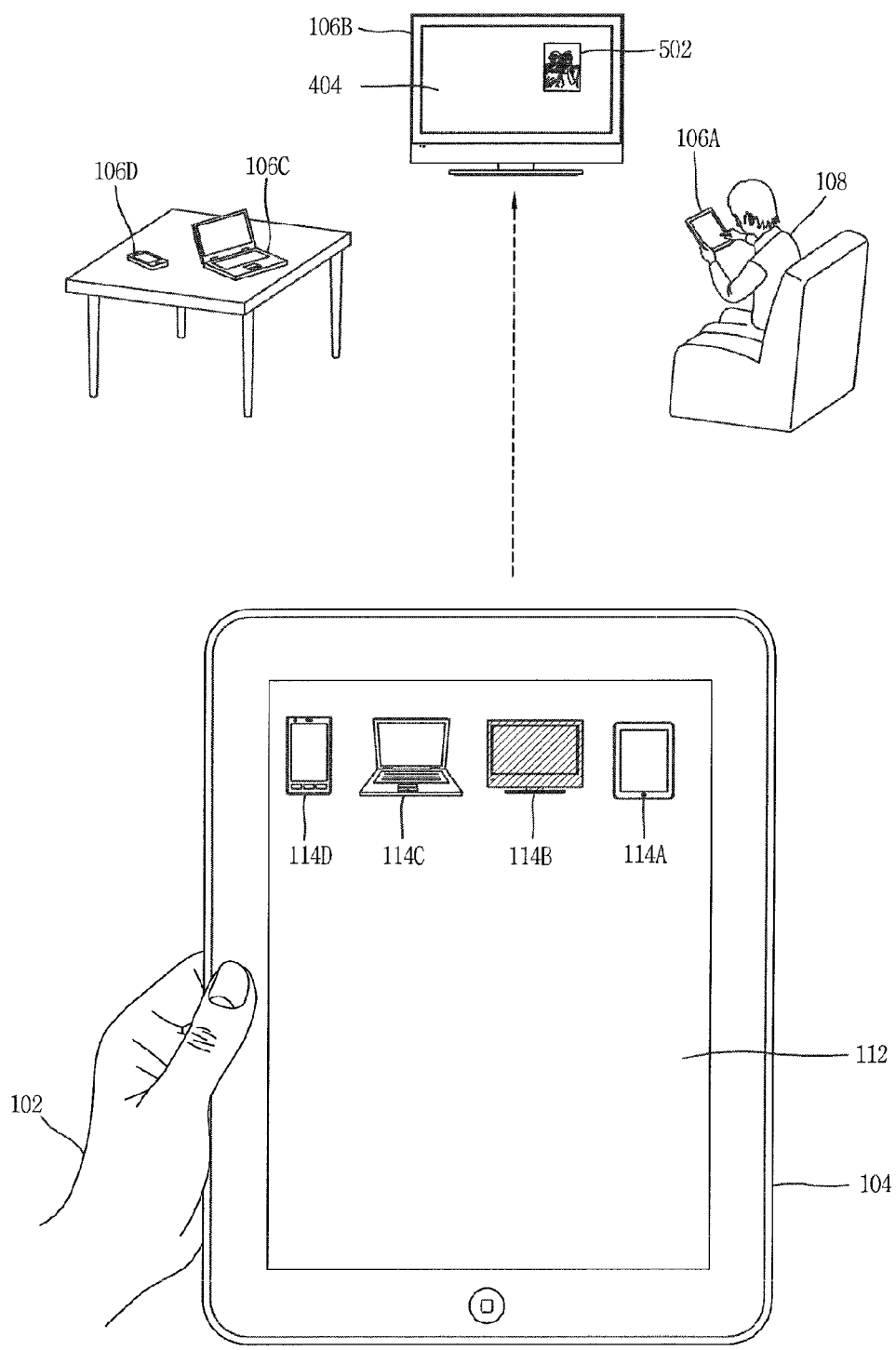

FIGS. 4-6 illustrate an exemplary view of the smart device 104 in FIG. 1 cancelling data sharing with the first smart device 106A and performing data sharing with a second smart device 106B, according to one embodiment of the present disclosure. In FIG. 4, an image of shared data in part 402A is displayed on the first display unit 310 of the first smart device 106A and an image of shared data in part 402B is displayed on a display unit 404 of the second smart device 106B when the image of shared data 116 is extended over the first image of first smart device 114A and the second image of second smart device 114B displayed on the display unit 112 of the smart device 104. In one embodiment, the shared data 302 and the position data 306 of the image of shared data 116 with respect to coordinates of the image of first smart device 114A are transmitted to the first smart device 106A. Accordingly, the image of shared data in part 402A is displayed on the display unit 310 of the first smart device 106A. In addition, the shared data 302 and the position data 306 of the image of shared data 116 with respect to coordinates of the image of second smart device 114B are transmitted to the second smart device 106B. Accordingly, the image of shared data in part 402B is displayed on the display unit 404 of the second smart device 106B.

In FIG. 5, the transmission of the shared data 302 to the first smart device 106A is canceled when the image of shared data 116 is moved out of the domain of the first image of first smart device 114A on the display unit 112 while the control of the shared data 302 is maintained. When the transmission to the first smart device 106A is canceled, the portion of the shared data 302 transmitted to the first smart device 106A is deleted or becomes inaccessible such that the user 108 may not access the portion of the shared data 302 using the first smart device 106A.

Further, in one example implementation, the control of the shared data 302 is maintained when the user 102 continues to maintain a contact with the image of shared data 116 while the image of shared data 116 is moved in and out of the first image of first smart device 114A displayed on the display unit 112 of the smart device 104. However, if the user 102 releases the control of the image of shared data 116 while the image of shared data 116 is within the domain of the first image of first smart device 114A displayed on the display unit 112, the transmission of the shared data 302 is performed until its completion, and the user 102 may not undo the transmission of the shared data 302 to the first smart device 106A.

Further, in FIG. 5, the shared data 302 is transmitted to the second smart device 106B when the image of shared data 116 enters the domain of the second image of second smart device 114B. Then, a transmitted image of shared data 502 is displayed on the second display unit 404 of the second smart device 106B, and the transmission of the shared data 302 is continued until its completion.

FIG. 6 illustrates an exemplary view where the transmission of the shared data 302 is completed. As the transmission is completed, the image of shared data 116 placed on the second image of second smart device 114B is no longer seen on the display unit 112. In addition, upon completion of the transmission of the shared data 302, the transmitted image of shared data 502 is displayed on the display unit 404 of the second smart device 106B. Further, the size or complexion of the image of second smart device 114B is changed to indicate that the second smart device 106B is currently directed by the smart device 104 as the target device.

Figure 7:
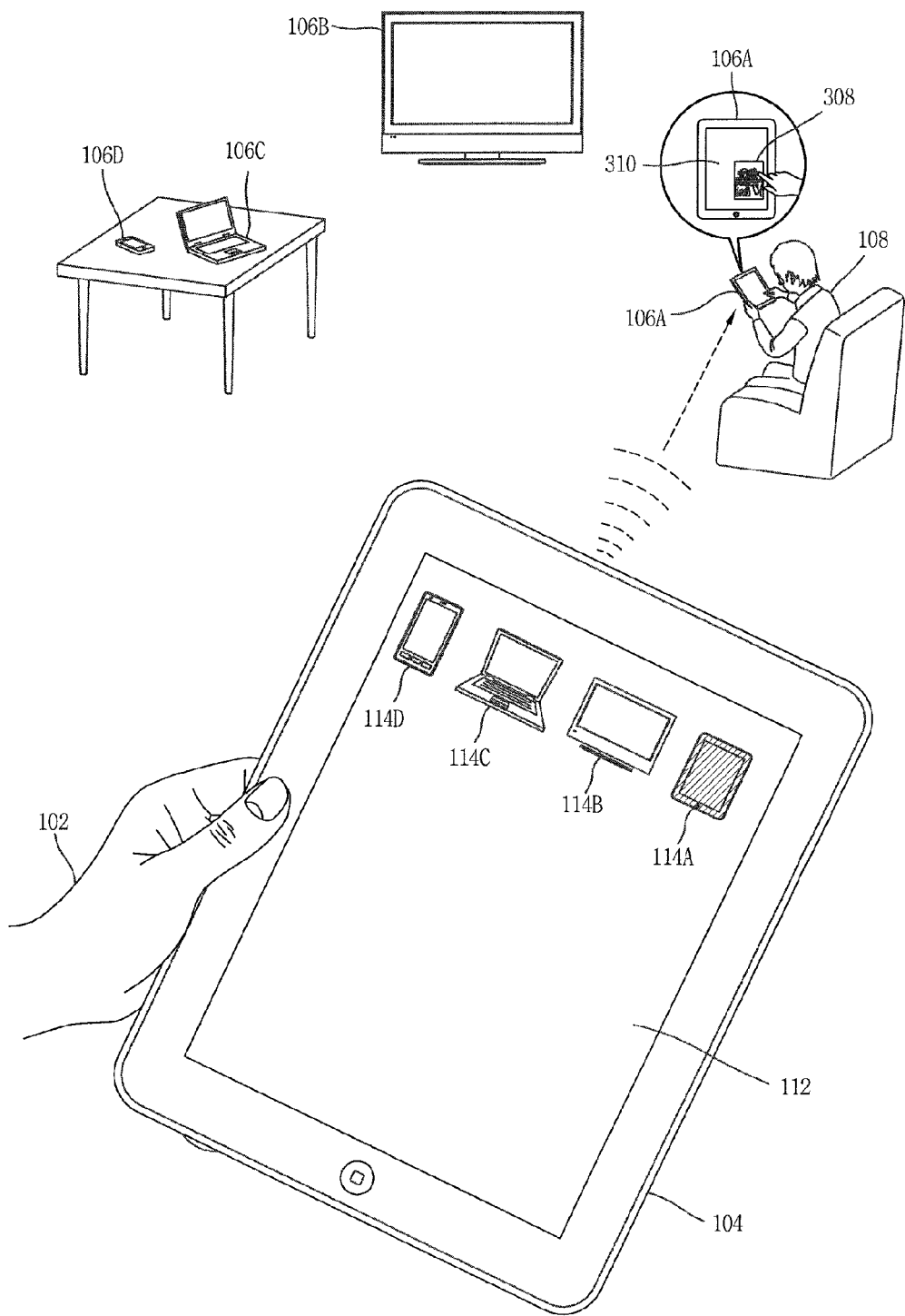
FIG. 7 illustrates an exemplary view of the smart device in FIG. 1 relinquishing control of the shared data, according to one embodiment of the present disclosure.

FIG. 7 illustrates an exemplary view of the smart device 104 in FIG. 1 relinquishing control of the shared data 304, according to one embodiment of the present disclosure. The control of the smart device 104 for the shared data 302 may be relinquished once a certain time period (e.g., 3 seconds) lapses since the placement of the image of shared data 116 within the domain of the image of the target device (e.g., the image of first smart device 114A). Alternatively, the control of the shared data 302 may be relinquished when the user 108 affirms the receipt of the shared data 302 by pressing the transmitted image of shared data 308 displayed on the first display unit 310 of the first smart device 106A, as illustrated in FIG. 7.

Figure 8:
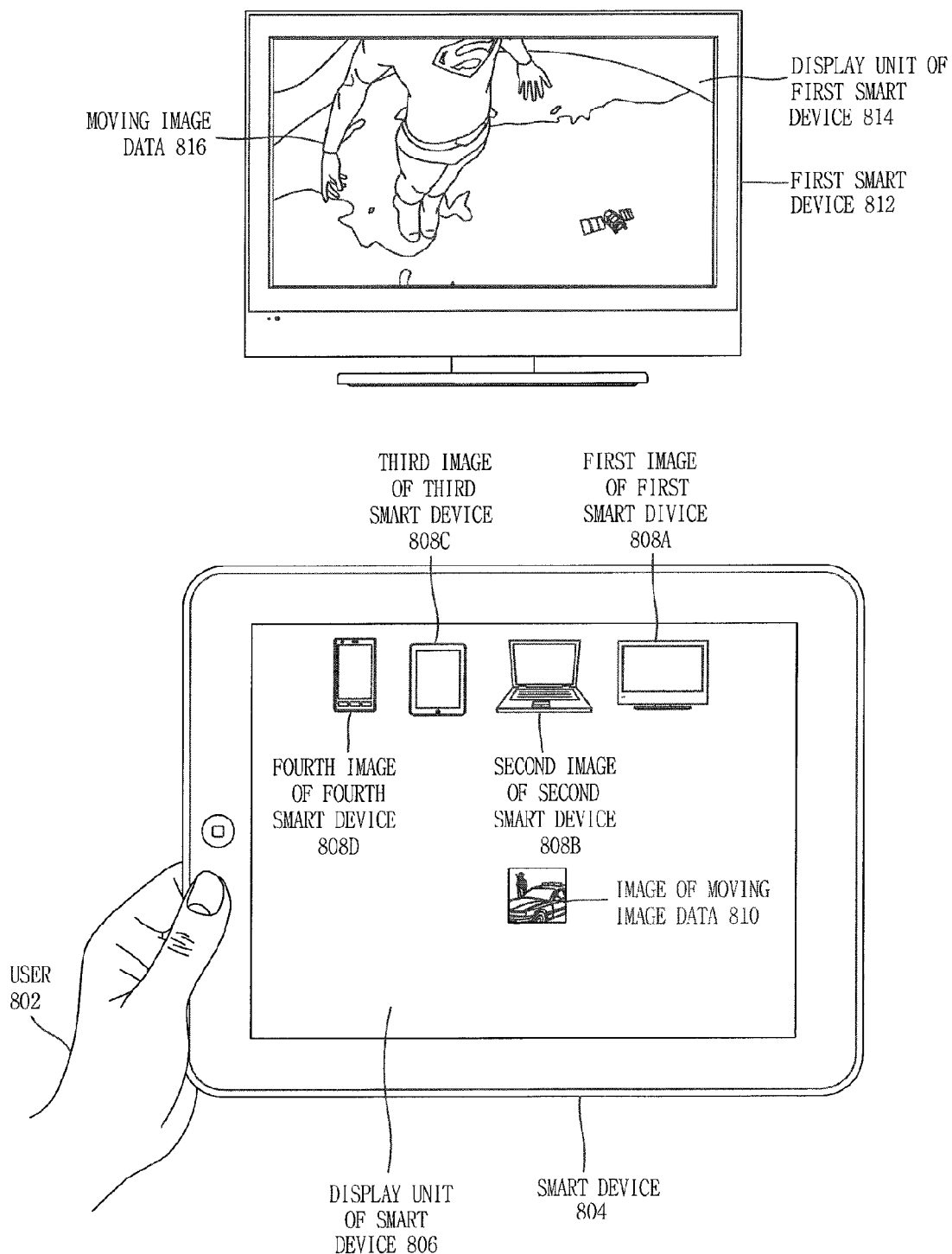

FIGS. 8-13 illustrate an exemplary view of the smart device in FIG. 1 interacting with a target device for sharing moving image data, according to one embodiment of the present disclosure. In FIG. 8, a user 802 may want to play a movie the user has been watching with a smart device 804 (e.g., a tablet PC) on a bigger screen of a first smart device 812 (e.g., a smart TV). As illustrated in FIG. 8, the first smart device 812 is playing a movie or executing moving image data 816, which is being displayed on a display unit 814 of the first smart device 812. In addition, the smart device 804 displays on its display unit 806 associated smart devices in their image forms, such as a first image of first smart device 808A, a second image of second smart device 808B, a third image of third smart device 808C, and a fourth image of fourth smart device 808D. Further, the smart device 804 displays an image of moving image data 810, which may be a thumbnail image of the movie that the user 802 wants to play on the first smart device 812.

Figure 9:
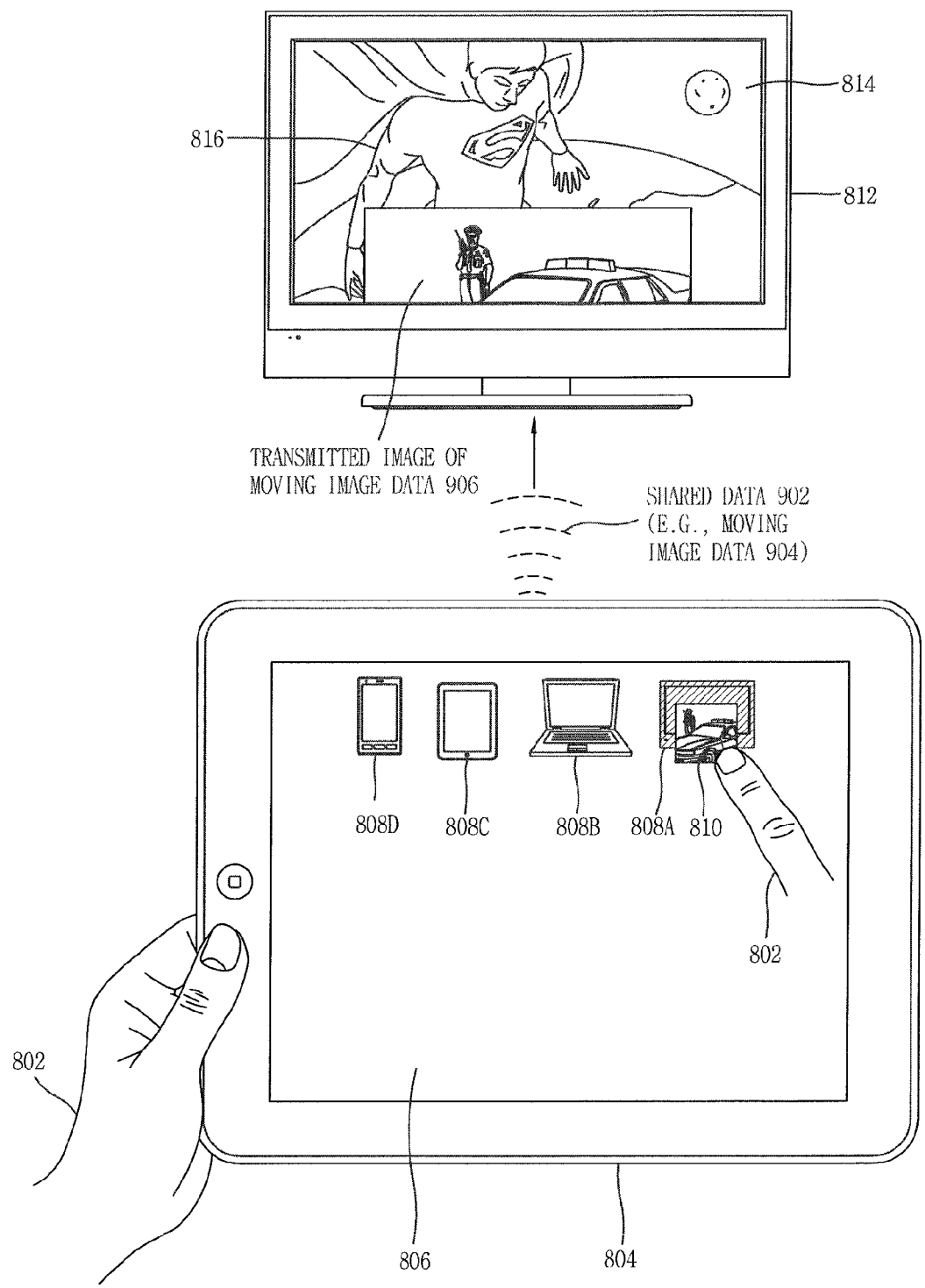

In FIG. 9, as the first smart device 812 is selected as the target device, and the user 802 brings an upper part of the image of moving image data 810 within the domain of the image of first smart device 808A, a transmitted image of moving image data 906 appears on the display unit 814 of the first smart device 812. That is, the upper part of the image of moving image data 810 appears on the display unit 814, where the moving image data 816 which has been playing on the first smart device 812 is paused by then. In addition, the shared data 902 (e.g., moving image data 904 which is represented by the image of moving image data 810) is transmitted to the first smart device 812. In one embodiment, the transmitted image of moving image data 906 is a thumbnail image of the moving image data 904. In such a way, the user 802 may feel that the transmission of the moving image data 904 is in progress as the user 802 watches the transmitted image of moving image data 906 appearing on the display unit 814 of the first smart device 812 while the moving image data 904 is being transmitted to and buffered by the first smart device 812.

Figure 10:
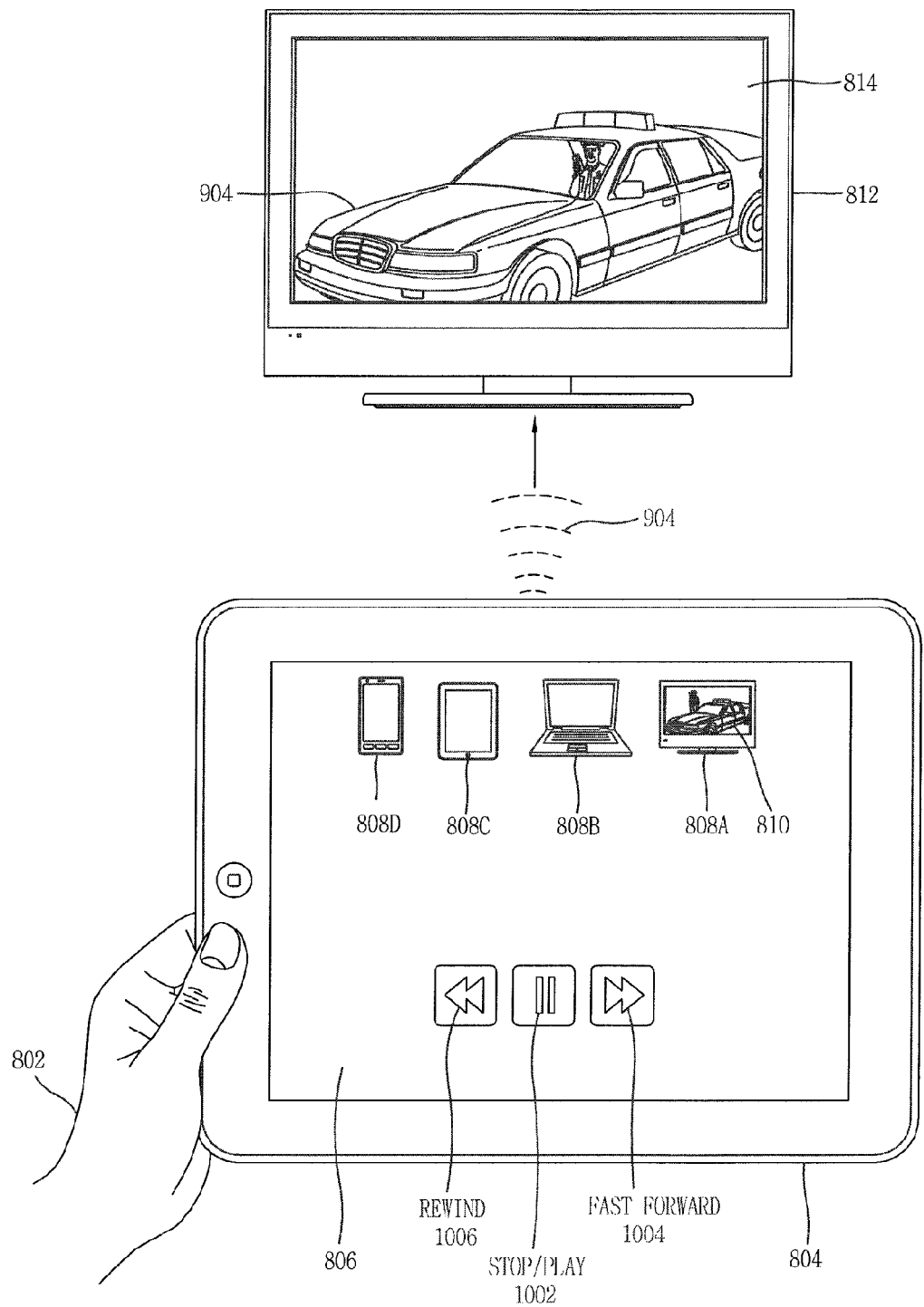

In FIG. 10, as the image of moving image data 810 is brought within the domain of the first image of first smart device 808A, the moving image data 904 is played on the first smart device 812. While the moving image data 904 (e.g., a movie) is being executed, a control of the moving image data 904 is maintained. That is, the moving image data 904 played by the first smart device 812 is controlled by touch buttons displayed on the display unit 806 of the smart device 804, such as a stop/play button 1002, a fast forward button 1004, a rewind button 1006, etc.

Figure 11:
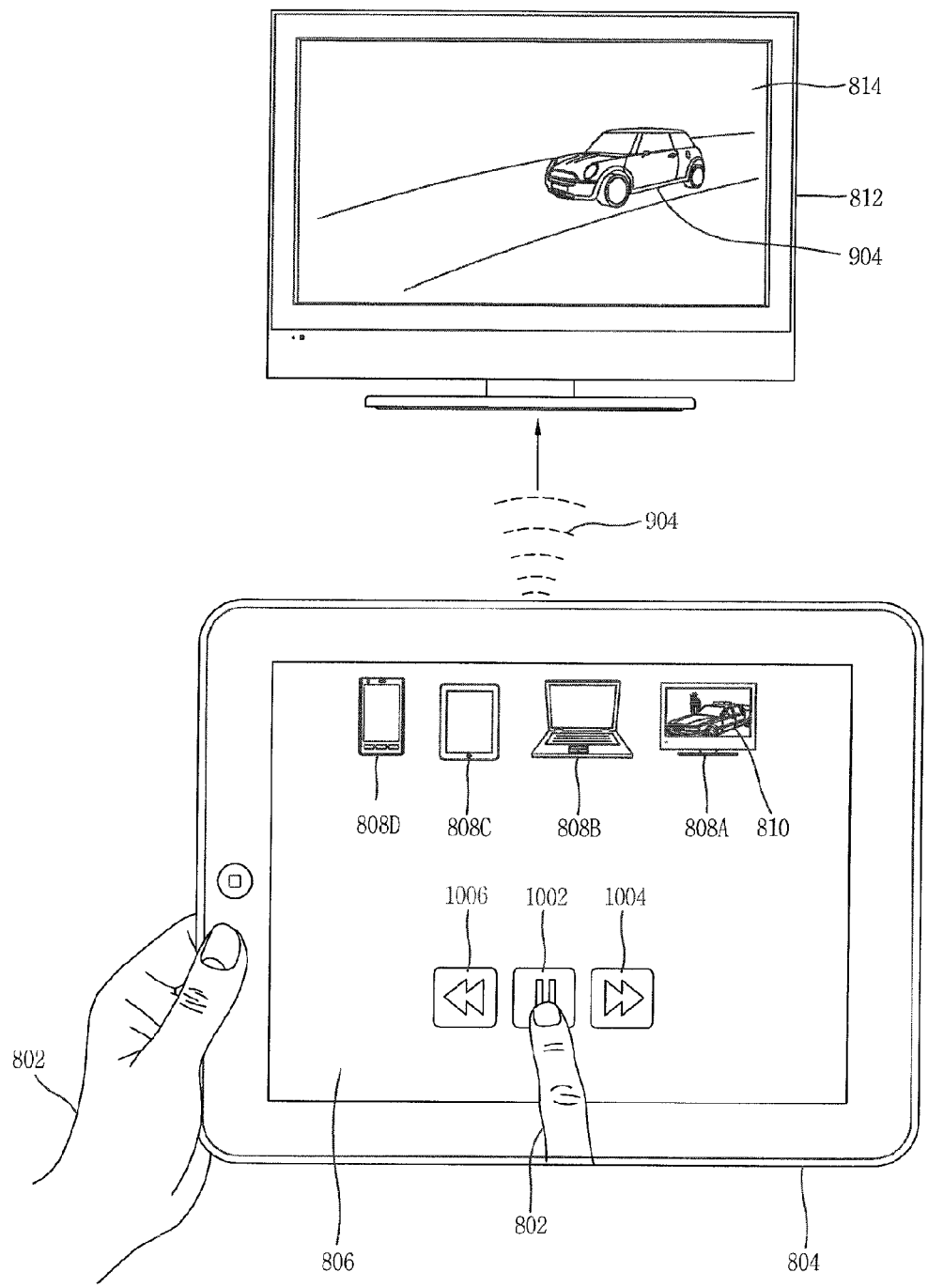
Figure 12:
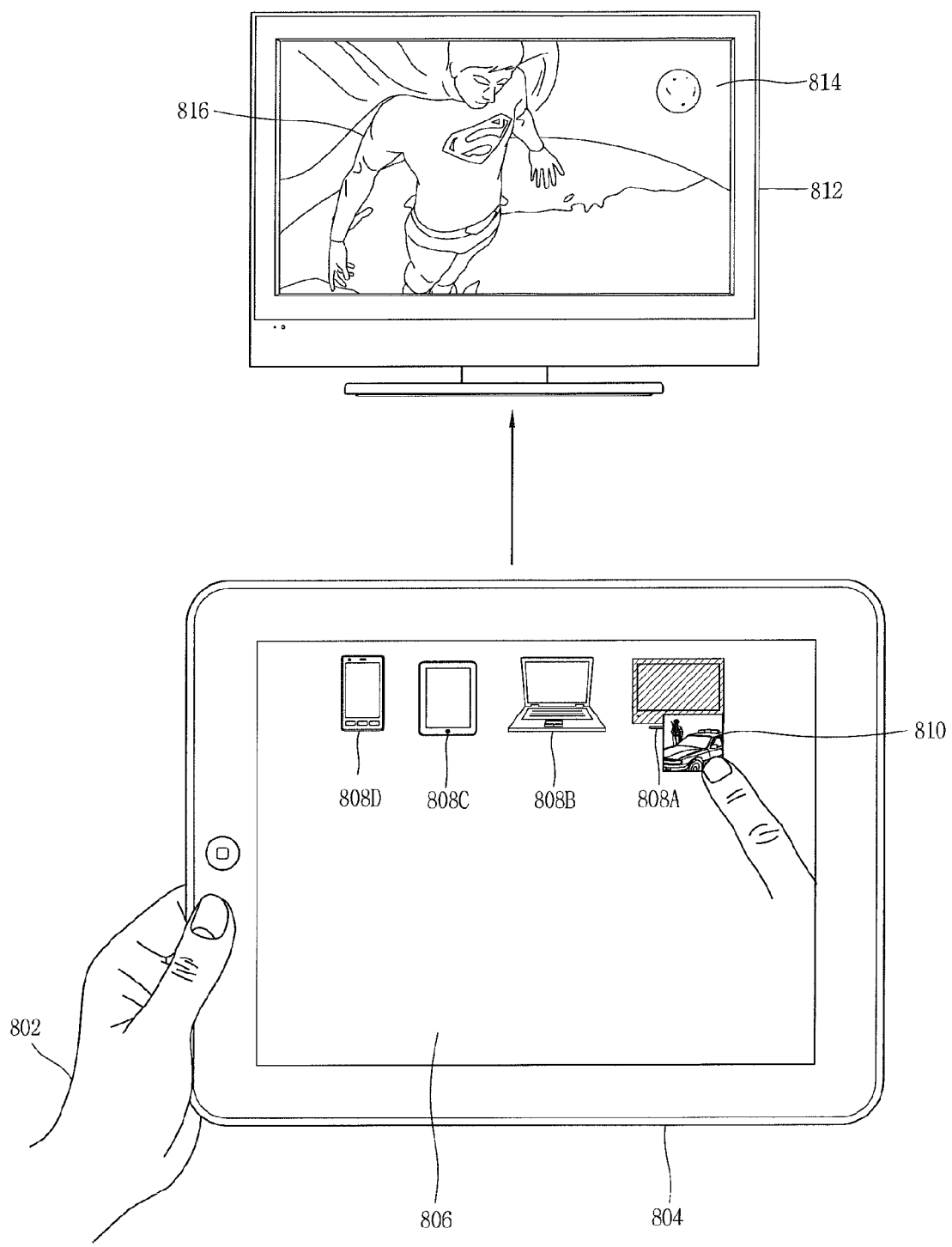

In FIG. 11, the moving image data 904 being played on the first smart device 812 is stopped when the stop button 1002 or a pause button is pressed by the user 802. The moving image data 816 which was paused and/or was in the background continues to play as the image of moving image data 810 is brought out of the domain of the first image of first smart device 808A, as illustrated in FIG. 12. Then, as illustrated in FIG. 13, the moving image data 904 automatically continues to play on the display unit 806 of the smart device 804 from the point where it was stopped in FIG. 11. Alternatively, the moving image data 904 displayed on the display unit 806 is paused when the image of moving image data 810 is brought out of the domain of the first image of first smart device 808A. And, the moving image data 904 continues to play on the display unit 806 of the smart device 804 from the point where it was stopped in FIG. 11 only after the play button 1002 is pressed.

Figure 14:
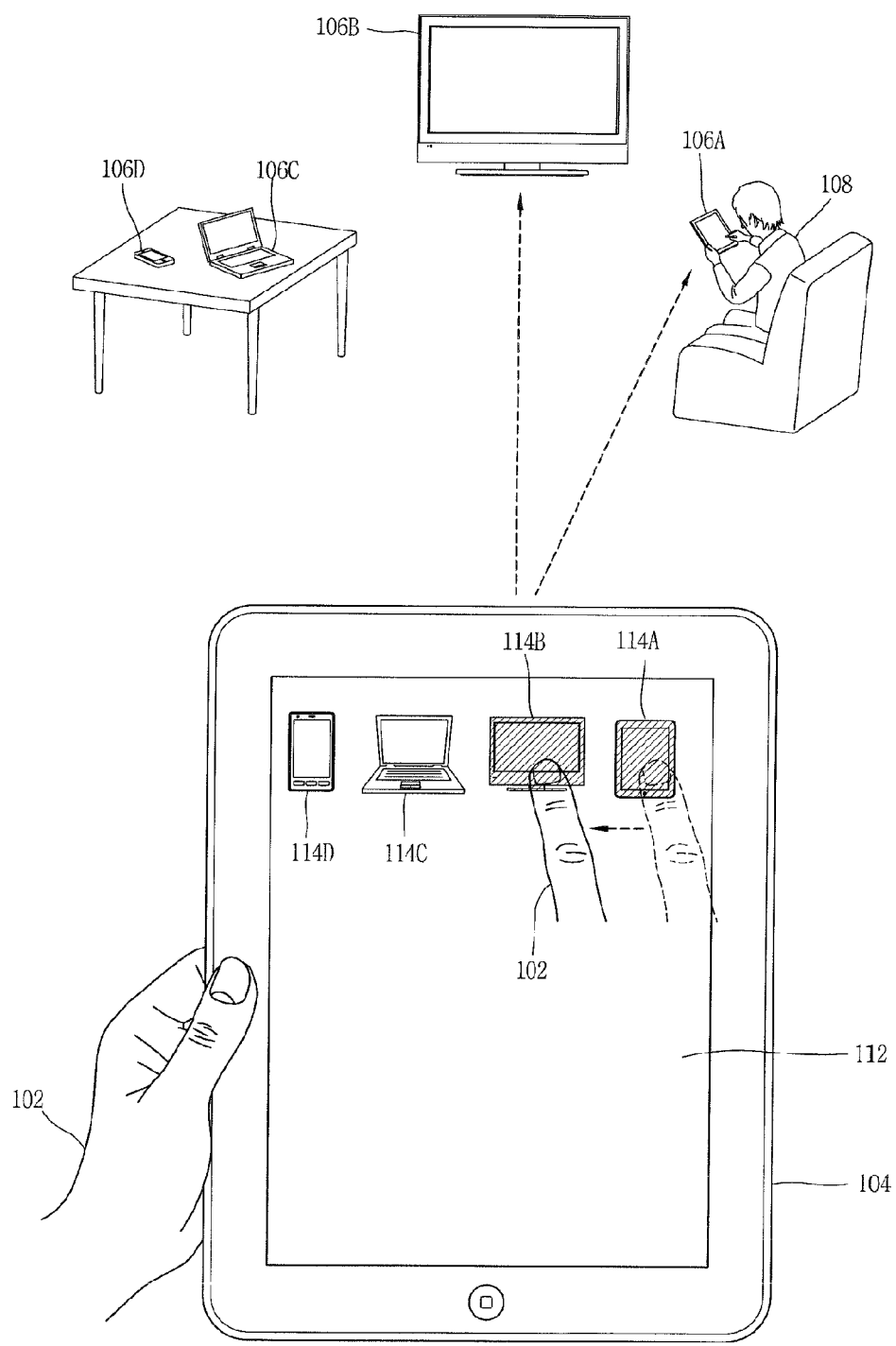
FIGS. 14 and 15 illustrate an exemplary process of the smart device in FIG. 1 for sharing data with multiple smart devices, according to one embodiment of the present disclosure.
Figure 15:
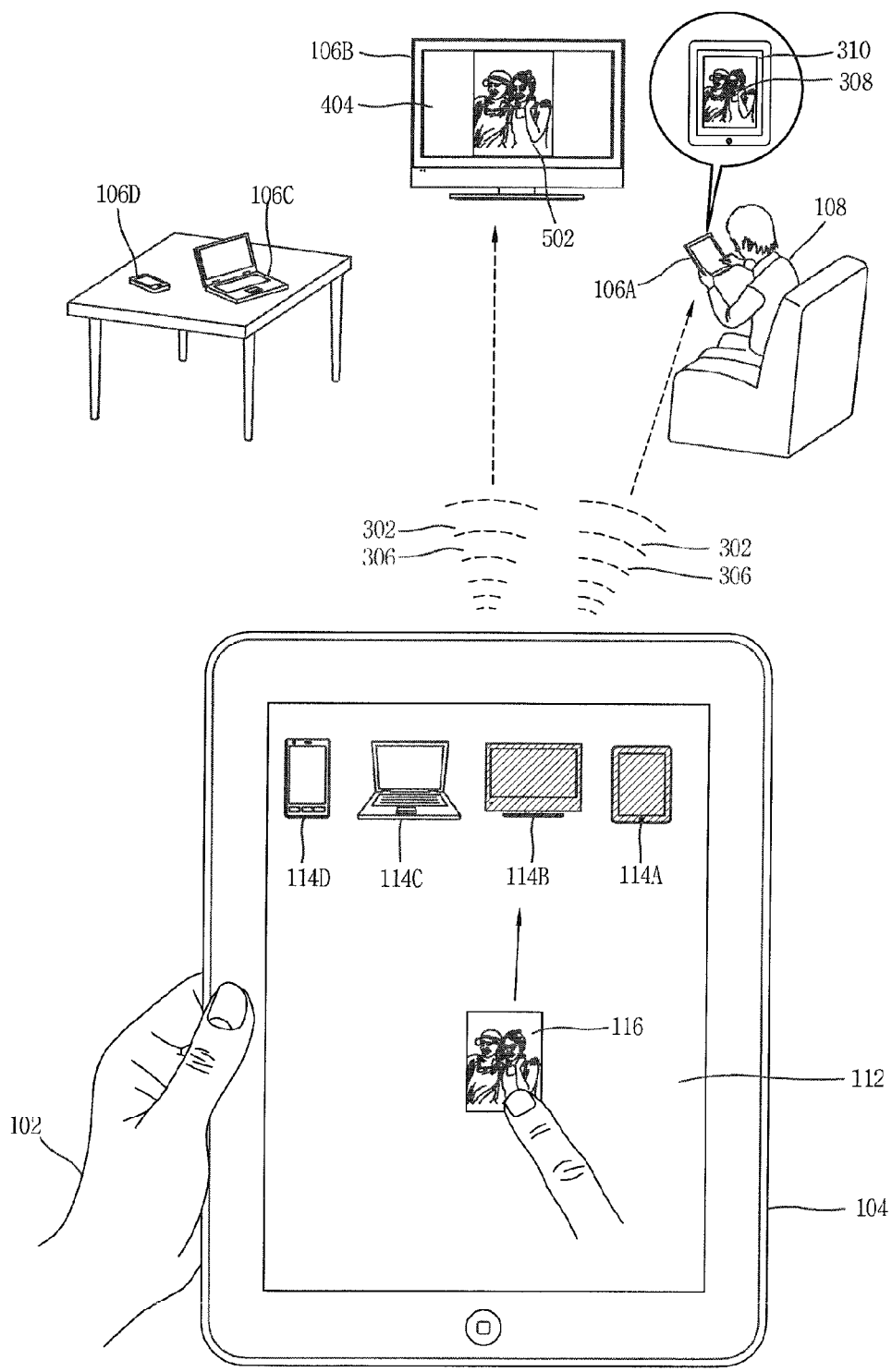

FIGS. 14 and 15 illustrate an exemplary process of the smart device 104 in FIG. 1 for sharing data with multiple smart devices, according to one embodiment of the present disclosure. In FIG. 14, the first smart device 106A is selected as the target device when the first smart device 106A is directed, and an input for selecting the first smart device 106A (e.g., a double click) is applied to the first image of first smart device 114A. Then, the second image of second smart device 114B changes its appearance when the second smart device 106B is targeted as an additional target device for data sharing. Further, the second smart device 106B is selected as the additional target device when an input for selecting the second smart device (e.g., a double click) is applied to the second image of second smart device 114B.

In FIG. 15, the shared data 302 and/or the position data 306 are transmitted to the first smart device 106A and the second smart device 106B in a multi-cast manner when the image of shared data 116 (e.g., the still image data 304) is moved within the domain of the first image of first smart device 114A and/or the domain of the second image of second smart device 114B. Alternatively, once the target devices are designated, a flick of the image of shared data 116 toward the domain of the first image of first smart device 114A and/or the domain of the second image of second smart device 114B may initiate the transmission of the shared data 302 and/or the position data 306 to the first smart device 106A and the second smart device 106B.

In FIG. 15, when the image of shared data 116 is moved within or toward the first image of first smart device 114A and the second image of second smart device 114B, the transmitted image of shared data 308 and the transmitted image of shared data 502 appear on the first display unit 310 of the first smart device 106A and the second display unit 404 of the second smart device 106B, respectively. Further, the first image of first smart device 114A and the second image of second smart device 114B maintain the changed look (e.g., a change in size, a change in complexion, etc.) until an input for relinquishing control of the first smart device 106A and the second smart device 106B is applied to the smart device 104.

Figure 18:
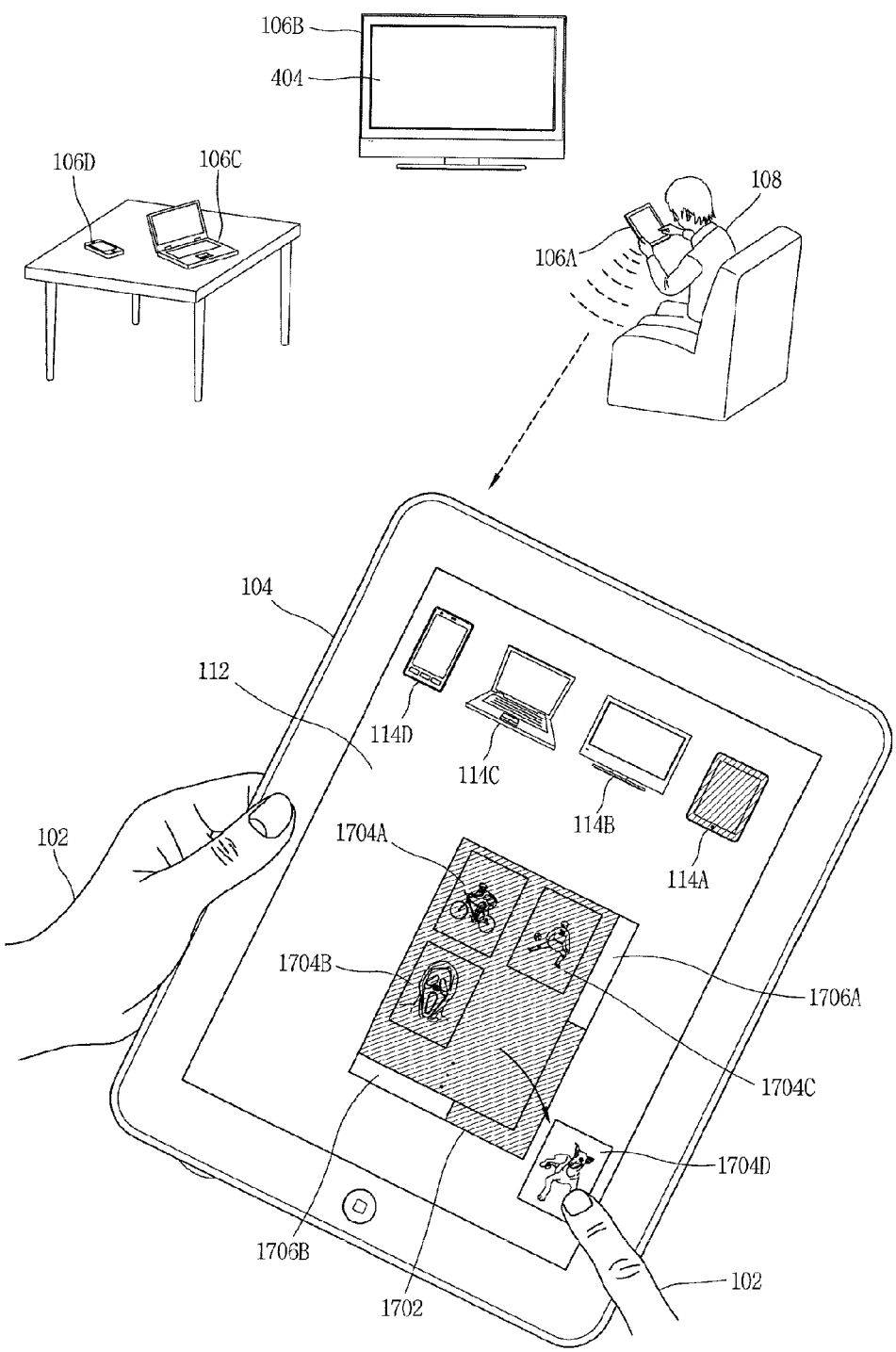

FIGS. 16-18 illustrate an exemplary process of the smart device 104 in FIG. 1 for accessing data in a target device, according to one embodiment of the present disclosure. In FIG. 16, the user 102 directs the smart device 104 toward the first smart device 106A to select it as the target device. Then, the user 102 may tap (e.g., or some other input method, such as clicking for a prolonged time) the first image of first smart device 114A displayed on the smart device 104 in order to access data stored and/or provided by the first smart device 106A. In one example implementation, the data may be stored in a memory of the first smart device 106A, or the data may be stored in a remote server that may be accessed via the first smart device 106A.

Then, upon tapping the first image of first smart device 114A, a window 1702 appears on the display unit 112 of the smart device 104. In one example embodiment, an image of shared data 1704A, an image of shared data 1704B, an image of shared data 1704C, and an image of shared data 1704D are displayed within the window 1702. An additional list of the data in the window 1702 may be accessed using a scroll bar 1706A and a scroll bar 1706B.

In FIG. 18, shared data represented by the image of shared data 1704D from the first smart device 106A is transmitted by the first smart device 106A and/or received by the smart device 104 when the image of shared data 1704D is moved from the window 1702 to the domain of the smart device 104 (e.g., the area of the display unit 112 which is outside the window 1702).

Figure 19:
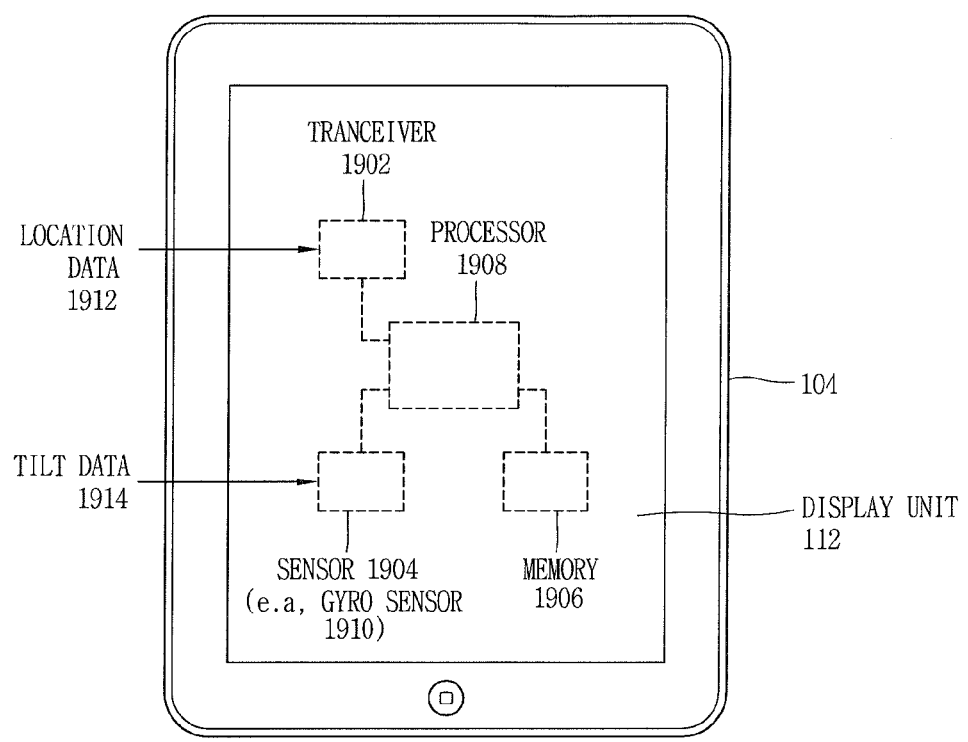
FIG. 19 illustrates an exemplary component view of the smart device in FIG. 1, according to one embodiment of the present invention.

FIG. 19 illustrates an exemplary component view of the smart device 104 in FIG. 1, according to one embodiment of the present invention. As illustrated in FIG. 19, the smart device 104 comprises a transceiver 1902, the display unit 112, a memory 1906, and a processor 1908 coupled to the transceiver 1902, the display unit 112, and the memory 1906. In one embodiment, the processor 1908 is configured to generate, to display on the display unit 112, images for associated smart devices within the coverage of the network and an image of shared data. The processor 1908 is also configured to effect a change in an image for one of the associated smart devices when the associated smart device is targeted as the target device for data sharing. Further, the processor 1908 is configured to communicate the shared data with the associated smart device selected as the target device via the network when the image of the shared data is moved to or from a domain of the image of the associated smart device displayed on the smart device 104.

In one embodiment, the smart device 104 also comprises a sensor 1904. Further, the sensor 1904 may be based on a gyro sensor, an acceleration sensor, a geomagnetic sensor, or other type of sensor. Further, in one example implementation, the processor 1908 is configured to identify the target device based on location data 1912 of the target device and tilt data 1914 sensed by the gyro sensor when the associated smart device is targeted as the target device. In addition, the shared data may be stored in the memory 1906.

Figure 20:
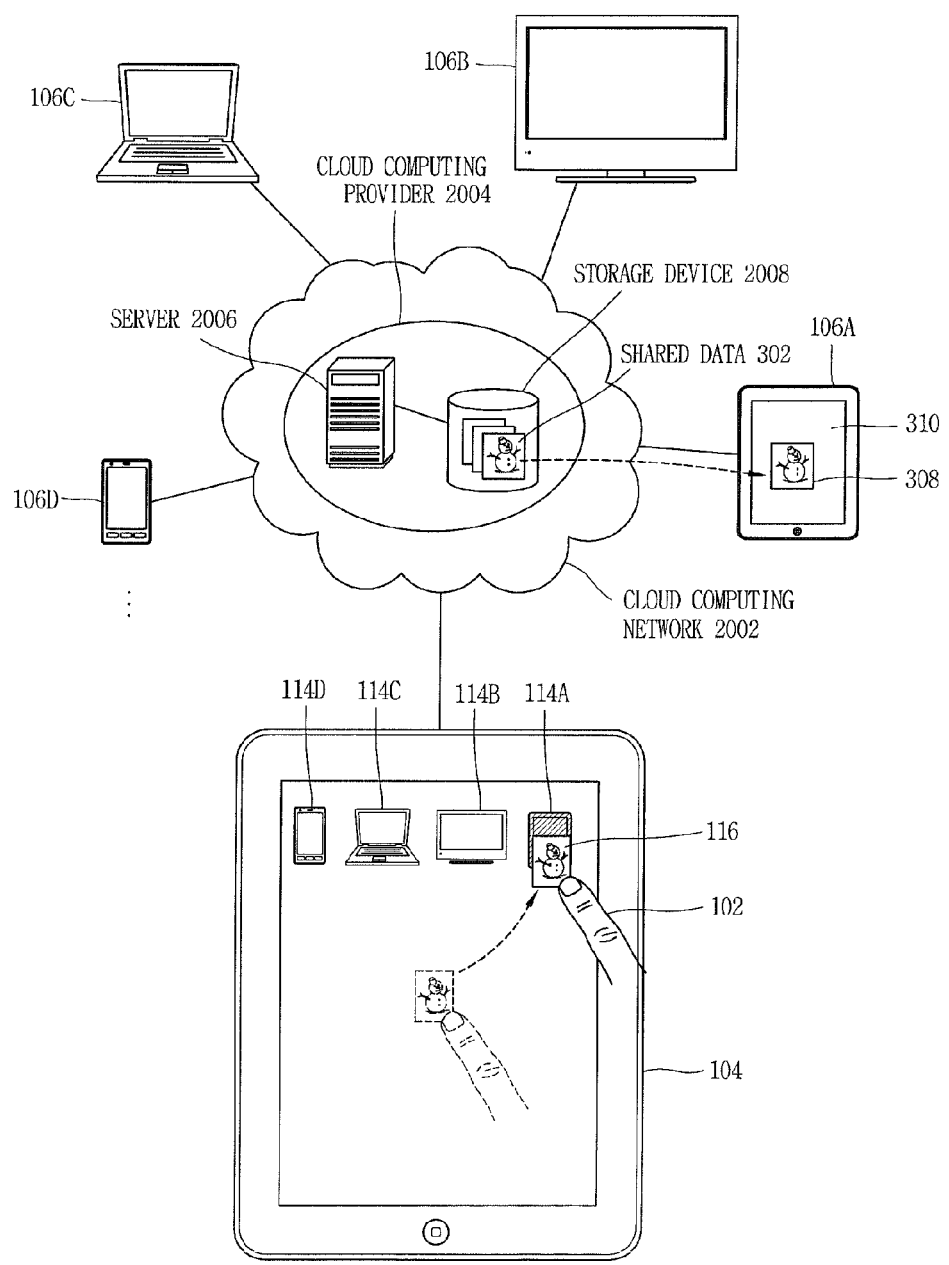
FIG. 20 illustrates an exemplary network view of the smart device in FIG. 1 interacting with associated smart devices via a cloud computing network, according to one embodiment of the present disclosure.

FIG. 20 illustrates an exemplary network view of the smart device 104 in FIG. 1 interacting with associated smart devices 106A-D via a cloud computing network 2002, according to one embodiment of the present disclosure. In FIG. 20, the smart device 104 is connected to the first smart device 106A, the second smart device 106B, the third smart device 106C, and the fourth smart device 106D via the cloud computing network 2002. In addition, the shared data 302 is stored in a storage device 2008 coupled to a server 2006 serviced by a cloud computing provider 2004.

As illustrated in FIG. 20, as the image of shared data 116 is moved within the domain of the first image of first smart device 114A displayed on the smart device 104, the transmitted image of shared data 308 appears on the first display unit 310 of the first smart device 106A. Further, the shared data 302 is transmitted to the first smart device 106A. Alternatively, as illustrated in FIGS. 1-19, the shared data 302 may be transmitted directly from the smart device 104, which locally stores the shared data 302 in its memory, to the first smart device 106A. It is appreciated that the device, process, and system illustrated in FIG. 20 may be applied to the case where shared data available in a target device is accessed by a smart device, as illustrated in FIGS. 16-18.

Figure 21:
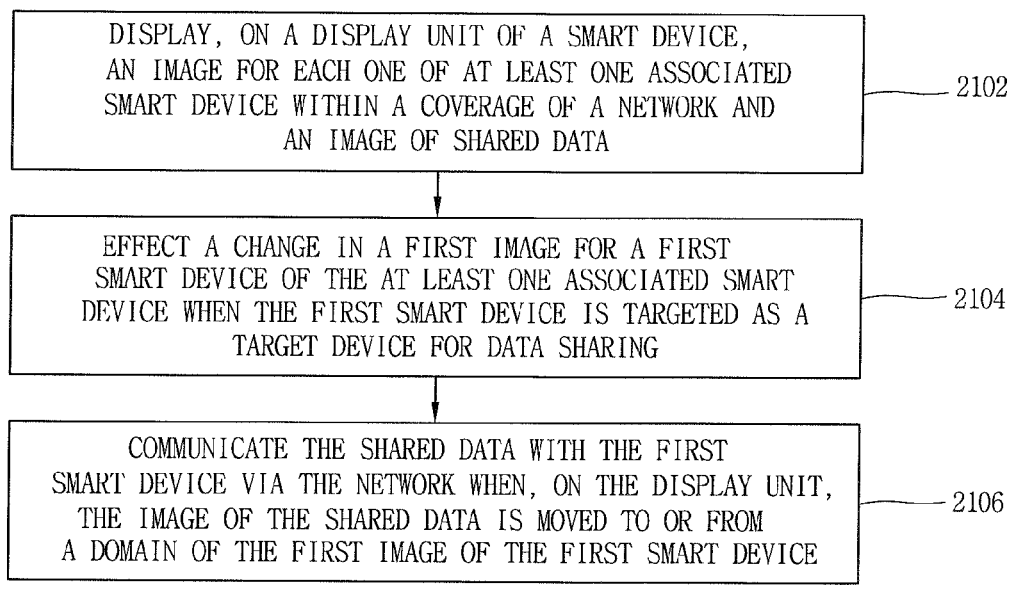
FIG. 21 illustrates a process flow chart of an exemplary method of the smart device in FIG. 1 for sharing data with a target device via a network, according to one embodiment of the present disclosure.

FIG. 21 illustrates a process flow chart of an exemplary method of the smart device 104 in FIG. 1 for sharing data with a target device via a network, according to one embodiment of the present disclosure. In keeping with the previous examples, particular components described with respect to FIGS. 1-20 are referenced as performing the process in FIG. 21. It should be noted that the components that are referred to as performing the process are for illustrative purposes only. In some implementations, other components, or a different combination of components within a system, may instead perform the process in FIG. 21.

In operation 2102, as illustrated in FIG. 1, the images 114A-D for associated smart devices 106A-D within the coverage of the network of the smart device 104 is displayed on the display unit 112 of the smart device 104. In operation 2104, as illustrated in FIG. 2, a change in the first image of first smart device 114A is effected when the first smart device 106A is targeted as a target device for data sharing. In operation 2106, as illustrated in FIG. 3, the shared data 302 is communicated to the first smart device 106A via the network when the image of shared data 116 displayed on the display unit 116 of the smart device 104 is moved to or from the domain of the first image of first smart device 114A.

It is appreciated that the methods disclosed in FIG. 21 may be implemented in a form of a machine-readable medium embodying a set of instructions that, when executed by a machine, cause the machine to perform any of the operations disclosed herein.

Figure 22:
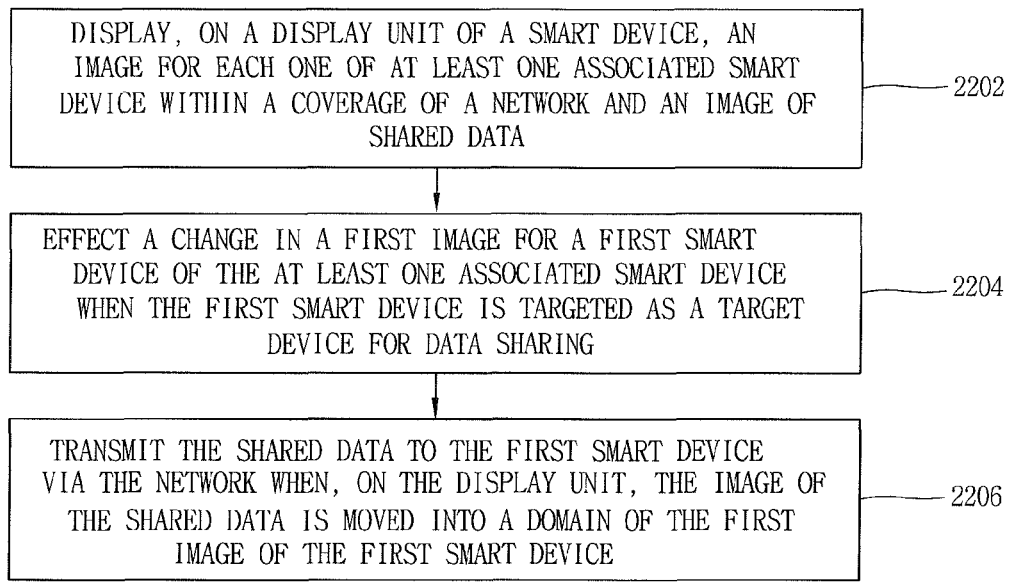
FIG. 22 illustrates a process flow chart of another exemplary method of the smart device in FIG. 1 for sharing data with a target device via a network, according to one embodiment of the present disclosure.

FIG. 22 illustrates a process flow chart of another exemplary method of the smart device 104 in FIG. 1 for sharing data with a target device via a network, according to one embodiment of the present disclosure. In keeping with the previous examples, particular components described with respect to FIGS. 1-20 are referenced as performing the process in FIG. 22. It should be noted that the components that are referred to as performing the process are for illustrative purposes only. In some implementations, other components, or a different combination of components within a system, may instead perform the process in FIG. 22.

In operation 2202, as illustrated in FIG. 1, the images 114A-D for associated smart devices 106A-D within the coverage of the network of the smart device 104 is displayed on the display unit 112 of the smart device 104. In operation 2204, as illustrated in FIG. 2, a change in the first image of first smart device 114A is effected when the first smart device 106A is targeted as a target device for data sharing. In operation 2206, as illustrated in FIG. 3, the shared data 302 is transmitted to the first smart device 106A via the network when the image of shared data 116 displayed on the display unit 116 of the smart device 104 is moved within the domain of the first image of first smart device 114A.

It is appreciated that the methods disclosed in FIG. 22 may be implemented in a form of a machine-readable medium embodying a set of instructions that, when executed by a machine, cause the machine to perform any of the operations disclosed herein.

Figure 23:
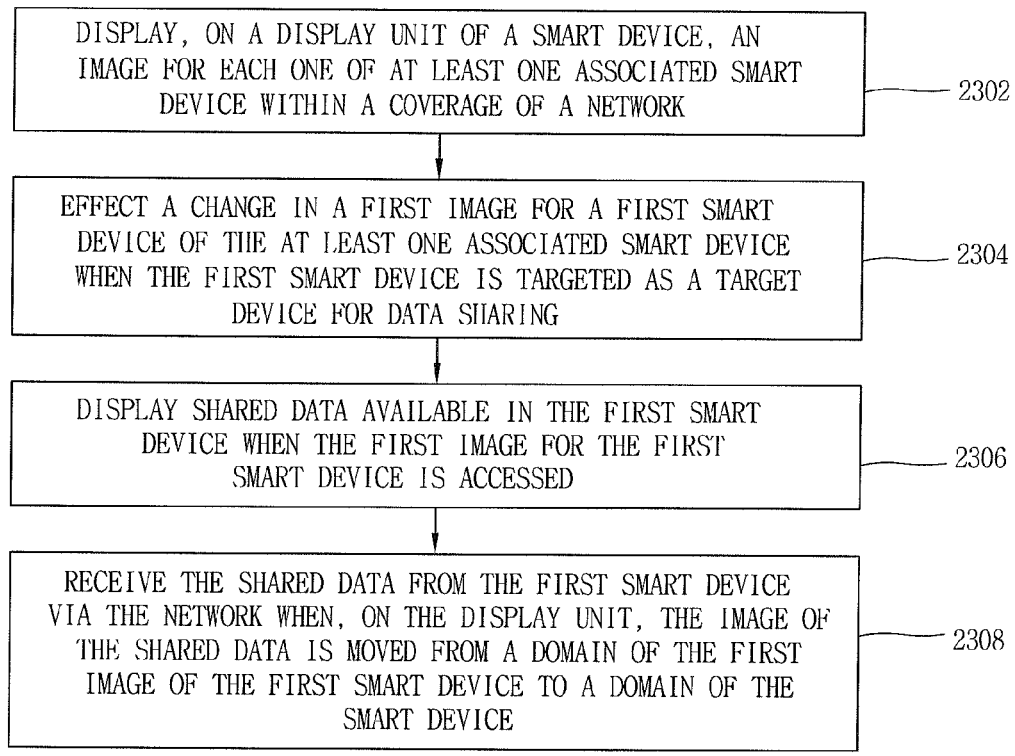
FIG. 23 illustrates a process flow chart of yet another exemplary method of the smart device in FIG. 1 for sharing data with a target device via a network, according to one embodiment of the present disclosure.

FIG. 23 illustrates a process flow chart of yet another exemplary method of the smart device 104 in FIG. 1 for sharing data with a target device via a network, according to one embodiment of the present disclosure.

In keeping with the previous examples, particular components described with respect to FIGS. 1-20 are referenced as performing the process in FIG. 23. It should be noted that the components that are referred to as performing the process are for illustrative purposes only. In some implementations, other components, or a different combination of components within a system, may instead perform the process in FIG. 23.

In operation 2302, as illustrated in FIG. 16, the images 114A-D for associated smart devices 106A-D within the coverage of the network of the smart device 104 is displayed on the display unit 112 of the smart device 104. In operation 2304, as illustrated in FIG. 16, a change in the first image of first smart device 114A is effected when the first smart device 106A is targeted as a target device for data sharing. In operation 2306, as illustrated in FIG. 17, shared data available in the first smart device 106A is displayed when the first image for first smart device 114A is accessed. Further, in operation 2308, as illustrated in FIG. 18, the shared data is received from the first smart device 106A through the network when, on the display unit 112 of the smart device 104, the image of shared data 116 is moved from the domain of the first image of first smart device 114A to the domain of the smart device 104.

It is appreciated that the methods disclosed in FIG. 23 may be implemented in a form of a machine-readable medium embodying a set of instructions that, when executed by a machine, cause the machine to perform any of the operations disclosed herein.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and features disclosed herein.

What is claimed is:

1. A smart device for data sharing with at least one associated smart device connected via a network, the smart device comprising:
   a transceiver;
   a display unit;
   a memory; and
   a processor coupled to the transceiver, the display unit, and the memory and the processor configured to:
      display on the display unit an image for each one of the at least one associated smart device within a coverage of the network simultaneously with an image of shared data;
      effect a change in a first image for a first smart device of the at least one associated smart device displayed on the display unit when the first smart device is targeted for the data sharing by directing a body of the image of the shared data to the first smart device; and
      transmit the shared data to the first smart device via the network when the image of the shared data is moved on the display unit onto or within a predetermined distance of the first image of the first smart device.

2. The smart device of claim 1, wherein the transceiver is configured to receive location data of the at least one associated smart device.

3. The smart device of claim 2, further comprising a gyro sensor.

4. The smart device of claim 3, wherein the processor is configured to identify the target device based on location data of the target device and tilt data sensed by the gyro sensor when the first smart device is targeted as the target device.

5. The smart device of claim 1, wherein the processor is further configured to maintain a control of the shared data until a release of the control of the shared data or an affirmation by the first smart device for successful receipt of the shared data.

6. The smart device of claim 5, wherein the processor is further configured to cancel transmission of the shared data when the image of the shared data is moved out of the image of the first smart device while the control of the shared data is maintained.

7. The smart device of claim 1, wherein the shared data is still image data.

8. The smart device of claim 7, wherein the processor is further configured to transmit position data of the still image data with respect to the image of the first smart device to the first smart device.

9. The smart device of claim 8, wherein the position data is processed by the first smart device to display the still image data on a designated area of a first display unit for the first smart device.

10. The smart device of claim 1, wherein the shared data is moving image data.

11. The smart device of claim 10, wherein the processor is further configured to maintain a control of the moving image data while the moving image data is displayed on a first display unit of the first smart device.

12. The smart device of claim 11, wherein the control of the moving image data comprises play, stop, fast forward, and rewind of the moving image data.

13. The smart device of claim 12, wherein the processor is further configured to continuously display the moving image data on the display unit when the moving image data is released by the first smart device.

14. The smart device of claim 1, wherein the image of the shared data is displayed on a first display unit of the first smart device when the image of the shared data is moved on the display unit onto or within the predetermined distance of the first image of the first smart device.

15. The smart device of claim 14, wherein the processor is further configured to cancel the shared data transmitted to the first smart device when the image of the shared data is moved on the display unit off of or a predetermined distance away from the first image of the first smart device on the display unit.

16. The smart device of claim 15, wherein the processor is yet further configured to transmit the shared data to a second smart device of the at least one associated device and seamlessly display the image of the shared data on a second display unit of the second smart device when the image of the shared data is moved on the display unit onto or within the predetermined distance of a second image of the second smart device.

17. The smart device of claim 15, wherein the image of the shared data is displayed on the first display unit of the first smart device in part and on the second display unit of the second smart device in part when the image of the shared data is extended over the first image of the first smart device and the second image of the second smart device displayed on the display unit.

18. The smart device of claim 1, wherein the image of the shared data displayed on the first display unit of the first smart device is a thumbnail image of the shared data.

19. The smart device of claim 18, wherein the processor is further configured to transmit the thumbnail image of the shared data to the first smart device prior to transmission of the shared data to the first smart device.

20. A method of a smart device for data sharing with at least one associated smart device connected via a network, the method comprising:
  displaying on a display unit of the smart device an image for each one of the at least one associated smart device within a coverage of the network simultaneously with an image of shared data;
  effecting a change in a first image for a first smart device of the at least one associated smart device displayed on the display unit when the first smart device is targeted for the data sharing by directing a body of the image of the shared data to the first smart device; and
  transmitting the shared data to the first smart device via the network when the image of the shared data is moved on the display unit onto or within a predetermined distance of the first image of the first smart device.

* * * * *